(12) United States Patent
Philyaw

(10) Patent No.: US 7,493,384 B1
(45) Date of Patent: *Feb. 17, 2009

(54) CONTROLLING A PC USING A TONE FROM A CELLULAR TELEPHONE

(75) Inventor: Jeffry Jovan Philyaw, Dallas, TX (US)

(73) Assignee: RPX-LV Acquisition LLC, Wilmington, DE (US)

( * ) Notice: Subject to any disclaimer, the term of this patent is extended or adjusted under 35 U.S.C. 154(b) by 1598 days.

This patent is subject to a terminal disclaimer.

(21) Appl. No.: 09/602,034

(22) Filed: Jun. 23, 2000

Related U.S. Application Data

(63) Continuation-in-part of application No. 09/378,221, filed on Aug. 19, 1999, now Pat. No. 6,745,234, which is a continuation-in-part of application No. 09/151,530, filed on Sep. 11, 1998, now Pat. No. 6,098,106, and a continuation-in-part of application No. 09/151,471, filed on Sep. 11, 1998, now abandoned.

(51) Int. Cl.
*G06F 15/173* (2006.01)

(52) U.S. Cl. .................. 709/224; 709/203; 709/217; 709/223

(58) Field of Classification Search .............. 709/227, 709/200, 201, 203, 217–220, 223–224, 228, 709/231, 238, 245, 319; 455/404, 455, 456
See application file for complete search history.

(56) References Cited

U.S. PATENT DOCUMENTS

| | | | |
|---|---|---|---|
| 3,668,312 A | 6/1972 | Yamamoto et al. ............ 348/17 |
| 4,002,886 A | 1/1977 | Sundelin ................ 235/61.7 R |
| 4,042,792 A | 8/1977 | Pakenham et al. ............ 179/90 |
| 4,365,148 A | 12/1982 | Whitney ..................... 235/383 |
| 4,621,259 A | 11/1986 | Schepers et al. ............ 345/180 |
| 4,654,482 A | 3/1987 | DeAngelis ................... 379/95 |
| 4,780,599 A | 10/1988 | Baus .......................... 235/383 |
| 4,785,296 A | 11/1988 | Tabata et al. ................. 340/731 |
| 4,816,904 A | 3/1989 | McKenna et al. ............. 348/13 |
| 4,817,136 A | 3/1989 | Rhoads ....................... 379/375 |
| 4,833,308 A | 5/1989 | Humble ...................... 235/383 |
| 4,841,132 A | 6/1989 | Kajitani et al. .............. 235/472 |
| 4,845,634 A | 7/1989 | Vitek et al. .................. 364/468 |

(Continued)

OTHER PUBLICATIONS

"Group Decision Support System: Development and Application", Energy Systems, Westinghouse, Pittsburgh, PA.

(Continued)

*Primary Examiner*—Lashonda T Jacobs
(74) *Attorney, Agent, or Firm*—Howison & Arnott, L.L.P.

(57) ABSTRACT

A method and apparatus for accessing information over a network (306) from a remote location (312) on the network (306) for delivery to a user PC (302). A cellular telephone (2500) is provided having a functional mode for web access over the network (306). A button (2502) on the phone is associated with the functional mode. The button on the phone (2500) is activated by a user to induce the functional mode when in proximity to the user PC (302). In response to activation of the functional mode, the user PC (302) is controlled to access information from the remote location (312) on the network (306) for delivery to the user PC (302) and display thereof to the user on a display (1612) associated with the user PC (302).

16 Claims, 14 Drawing Sheets

U.S. PATENT DOCUMENTS

| | | | |
|---|---|---|---|
| 4,894,789 A | 1/1990 | Yee | 348/552 |
| 4,899,370 A | 2/1990 | Kameo et al. | 379/104 |
| 4,901,073 A | 2/1990 | Kibrick | 341/13 |
| 4,905,094 A | 2/1990 | Pocock et al. | 386/106 |
| 4,907,264 A | 3/1990 | Seiler et al. | 379/216 |
| 4,916,293 A | 4/1990 | Cartlidge et al. | 235/375 |
| 4,937,853 A | 6/1990 | Brule et al. | 379/91 |
| 4,947,028 A | 8/1990 | Gorog | 235/380 |
| 4,959,530 A | 9/1990 | O'Connor | 235/383 |
| 4,975,948 A | 12/1990 | Andresen et al. | 379/355 |
| 4,984,155 A | 1/1991 | Geier et al. | 364/401 |
| 5,038,023 A | 8/1991 | Saliga | 235/385 |
| 5,054,096 A | 10/1991 | Beizer | 382/41 |
| 5,088,045 A | 2/1992 | Shimanaka et al. | 364/468 |
| 5,111,391 A | 5/1992 | Fields et al. | 364/401 |
| 5,115,326 A | 5/1992 | Burgess et al. | 358/440 |
| 5,128,752 A | 7/1992 | Von Kohorn | 358/84 |
| 5,144,654 A | 9/1992 | Kelley et al. | 379/356 |
| 5,161,037 A | 11/1992 | Saito | 358/468 |
| 5,161,214 A | 11/1992 | Addink et al. | 395/145 |
| 5,182,705 A | 1/1993 | Barr et al. | 364/401 |
| 5,189,630 A | 2/1993 | Barstow et al. | 364/514 |
| 5,191,525 A | 3/1993 | LeBrun et al. | 364/419 |
| 5,198,644 A | 3/1993 | Pfeiffer et al. | 235/383 |
| 5,235,654 A | 8/1993 | Anderson et al. | 382/61 |
| 5,241,402 A | 8/1993 | Aboujaoude et al. | 358/406 |
| 5,243,531 A | 9/1993 | DiPippo et al. | 364/468 |
| 5,247,347 A | 9/1993 | Litteral et al. | 348/7 |
| 5,262,860 A | 11/1993 | Fitzpatrick et al. | 348/461 |
| 5,285,278 A | 2/1994 | Holman | 348/10 |
| 5,287,181 A | 2/1994 | Holman | 348/473 |
| 5,288,976 A | 2/1994 | Citron et al. | 235/375 |
| 5,296,688 A | 3/1994 | Hamilton et al. | 235/375 |
| 5,304,786 A | 4/1994 | Pavlidis et al. | 235/462 |
| 5,305,195 A | 4/1994 | Murphy | 705/1 |
| 5,319,454 A | 6/1994 | Schutte | 348/5.5 |
| 5,324,922 A | 6/1994 | Roberts | 235/375 |
| 5,331,547 A | 7/1994 | Laszlo | 364/413.01 |
| 5,340,966 A | 8/1994 | Morimoto | 235/376 |
| 5,357,276 A | 10/1994 | Banker et al. | 348/7 |
| 5,362,948 A | 11/1994 | Morimoto | 235/376 |
| 5,382,779 A | 1/1995 | Gupta | 235/383 |
| 5,386,298 A | 1/1995 | Bronnenberg et al. | 358/403 |
| 5,398,336 A | 3/1995 | Tantry et al. | 395/600 |
| 5,405,232 A | 4/1995 | Lloyd et al. | 414/280 |
| 5,418,713 A | 5/1995 | Allen | 364/403 |
| 5,420,403 A | 5/1995 | Allum et al. | 235/375 |
| 5,420,943 A | 5/1995 | Mak | 382/313 |
| 5,424,524 A | 6/1995 | Ruppert et al. | 235/462 |
| 5,438,355 A | 8/1995 | Palmer | 348/1 |
| 5,446,490 A | 8/1995 | Blahut et al. | 348/7 |
| 5,446,919 A | 8/1995 | Wilkins | 455/6.2 |
| 5,491,508 A | 2/1996 | Friedell et al. | 348/16 |
| 5,493,107 A | 2/1996 | Gupta et al. | 235/383 |
| 5,519,878 A | 5/1996 | Dolin, Jr. | 395/800 |
| 5,530,852 A | 6/1996 | Meske, Jr. et al. | 396/600 |
| 5,563,630 A * | 10/1996 | Tsakiris et al. | 345/160 |
| 5,570,295 A | 10/1996 | Isenberg et al. | 379/90.01 |
| 5,572,643 A | 11/1996 | Judson | 395/793 |
| 5,592,551 A | 1/1997 | Lett et al. | 380/20 |
| 5,594,226 A | 1/1997 | Steger | 235/379 |
| 5,602,377 A | 2/1997 | Beller et al. | 235/462 |
| 5,604,542 A | 2/1997 | Dedrick | 348/552 |
| 5,640,193 A | 6/1997 | Wellner | 348/7 |
| 5,649,186 A | 7/1997 | Ferguson | 395/610 |
| 5,664,110 A | 9/1997 | Green et al. | 705/26 |
| 5,671,282 A | 9/1997 | Wolff et al. | 380/25 |
| 5,675,721 A | 10/1997 | Freedman et al. | 395/129 |
| 5,682,540 A | 10/1997 | Klotz, Jr. et al. | 395/766 |
| 5,694,163 A | 12/1997 | Harrison | 348/13 |
| 5,708,780 A | 1/1998 | Levergood et al. | 709/229 |
| 5,710,887 A | 1/1998 | Chelliah et al. | 395/226 |
| 5,715,314 A | 2/1998 | Payne et al. | 705/78 |
| 5,724,424 A | 3/1998 | Gifford | 705/79 |
| 5,745,681 A | 4/1998 | Levine et al. | 395/200.3 |
| 5,754,906 A | 5/1998 | Yoshida | 396/448 |
| 5,757,917 A | 5/1998 | Rose et al. | 380/25 |
| 5,761,606 A | 6/1998 | Wolzien | 455/6.2 |
| 5,764,906 A | 6/1998 | Edelstein et al. | 395/200.49 |
| 5,765,176 A | 6/1998 | Bloomberg | 707/514 |
| 5,768,528 A | 6/1998 | Stumm | 709/231 |
| 5,774,664 A | 6/1998 | Hidary et al. | 395/200 |
| 5,774,870 A | 6/1998 | Storey | 705/14 |
| 5,778,367 A | 7/1998 | Wesinger, Jr. et al. | 707/10 |
| 5,790,793 A | 8/1998 | Higley | 709/218 |
| 5,791,991 A | 8/1998 | Small | 463/41 |
| 5,794,210 A | 8/1998 | Goldhaber et al. | 705/14 |
| 5,796,952 A | 8/1998 | Davis et al. | 305/200.54 |
| 5,804,803 A | 9/1998 | Cragun et al. | 235/375 |
| 5,815,776 A | 9/1998 | Nukada | 399/174 |
| 5,832,223 A | 11/1998 | Hara et al. | 395/200.47 |
| 5,833,468 A | 11/1998 | Guy et al. | 434/350 |
| 5,848,202 A | 12/1998 | D'Eri et al. | 382/306 |
| 5,848,413 A | 12/1998 | Wolff | 707/10 |
| 5,854,897 A | 12/1998 | Radziewicz et al. | 709/224 |
| 5,864,823 A | 1/1999 | Levitan | 105/14 |
| 5,869,819 A | 2/1999 | Knowles et al. | 235/375 |
| 5,905,248 A | 5/1999 | Russell et al. | 235/462 |
| 5,905,251 A | 5/1999 | Knowles | 235/472.01 |
| 5,905,665 A | 5/1999 | Rim | 364/746 |
| 5,905,865 A | 5/1999 | Palmer et al. | 395/200.47 |
| 5,907,793 A | 5/1999 | Reams | 455/3.1 |
| 5,909,183 A * | 6/1999 | Borgstahl et al. | 340/825.22 |
| 5,913,210 A | 6/1999 | Call | 707/4 |
| 5,915,090 A | 6/1999 | Joseph et al. | 709/202 |
| 5,918,214 A | 6/1999 | Perkowski | 705/27 |
| 5,925,865 A | 7/1999 | Steger | 235/379 |
| 5,929,850 A | 7/1999 | Broadwin et al. | 345/327 |
| 5,932,863 A | 8/1999 | Rathus et al. | 235/462.15 |
| 5,933,829 A | 8/1999 | Durst et al. | 707/10 |
| 5,948,061 A | 9/1999 | Merriman et al. | 709/219 |
| 5,957,695 A | 9/1999 | Redford et al. | 434/307 R |
| 5,960,411 A | 9/1999 | Hartman et al. | 705/26 |
| 5,961,603 A | 10/1999 | Kunkel et al. | 709/229 |
| 5,970,471 A | 10/1999 | Hill | 705/26 |
| 5,970,472 A | 10/1999 | Allsop et al. | 705/26 |
| 5,971,277 A | 10/1999 | Cragun et al. | 235/462.01 |
| 5,974,443 A | 10/1999 | Jeske | 709/202 |
| 5,974,451 A | 10/1999 | Simmons | 709/218 |
| 5,976,833 A | 11/1999 | Furukawa et al. | 435/69.1 |
| 5,978,773 A | 11/1999 | Hudetz et al. | 709/219 |
| 5,991,739 A | 11/1999 | Cupps et al. | 705/26 |
| 5,991,749 A * | 11/1999 | Morrill, Jr. | 705/44 |
| 5,992,752 A | 11/1999 | Wilz, Sr. et al. | 235/472.01 |
| 5,995,105 A | 11/1999 | Reber et al. | 345/356 |
| 6,002,394 A | 12/1999 | Schein et al. | 345/327 |
| 6,003,073 A | 12/1999 | Solvason | 709/219 |
| 6,006,257 A | 12/1999 | Slezak | 709/219 |
| 6,009,410 A | 12/1999 | LeMole et al. | 709/219 |
| 6,009,465 A | 12/1999 | Decker et al. | 709/219 |
| 6,012,102 A | 1/2000 | Shachar | 710/5 |
| 6,018,764 A | 1/2000 | Field et al. | 709/217 |
| 6,049,539 A | 4/2000 | Lee et al. | 370/355 |
| 6,064,979 A | 5/2000 | Perkowski | 705/26 |
| 6,108,656 A * | 8/2000 | Durst et al. | 707/10 |
| 6,138,036 A * | 10/2000 | O'Cinneide | 455/557 |
| 6,148,405 A * | 11/2000 | Liao et al. | 726/2 |
| 6,223,029 B1 * | 4/2001 | Stenman et al. | 455/420 |
| 6,393,297 B1 * | 5/2002 | Song | 455/466 |
| 6,401,059 B1 * | 6/2002 | Shen et al. | 703/27 |
| 6,519,463 B2 * | 2/2003 | Tendler | 455/456.3 |
| 6,560,640 B2 * | 5/2003 | Smethers | 709/219 |
| 6,577,877 B1 * | 6/2003 | Charlier et al. | 455/557 |
| 6,622,165 B1 * | 9/2003 | Philyaw | 709/217 |

| | | | |
|---|---|---|---|
| 6,748,278 B1 * | 6/2004 | Maymudes | 700/17 |
| 6,754,698 B1 * | 6/2004 | Philyaw et al. | 709/217 |
| 7,092,768 B1 * | 8/2006 | Labuda | 700/19 |
| 7,194,259 B2 * | 3/2007 | DeLine | 455/420 |
| 7,328,045 B2 * | 2/2008 | Funk et al. | 455/560 |
| 2003/0095525 A1 * | 5/2003 | Lavin et al. | 370/338 |

OTHER PUBLICATIONS

"New Technologies in Credit Card Authentication", Pieter de Bryne, Institute for Communications Technology, Zurich, Switzerland.

"AVITAL, a Private Teaching System by Fax Communication", Atsusji Iizawa, Noriro Sugiki, Yukari Shitora and Hideko Kunii, Software Research Center, Tokyo, Japan.

"Document on Computer" USPS Technical Support Center, Norman, OK.

"Development of a Commercially Successful Wearable Data Collection System", Symbol Technologies, Inc.

What do forward looking companies consider in their plans and developments?, A.G. Johnston, Nestle.

"The Automation Synergy", Neves and Noivo, Portugal.

"Integration of Hand-Written Address Interpretation Technology into the United States Postal Service Remote Computer Reader System", Srihari (CEDAR, SUNY at Buffalo) and Kueberg (U.S. Postal Service, VA).

"Paper Based Document Security—A Review", van Renesse, TNO Institute of Applied Physics, The Netherlands.

"IEEE Standard for Bar Coding for Distribution Transformers" Transformers Committee of the IEEE Power Engineering Society, The Institute of Electrical and Electronics Engineers, Inc. NY.

"The Stylus™—Shopping from Home", STYLUS Innovation, MA.

"Distributing Uniform Resource Locators as Bar Code Images", IBM Technical Disclosure Bulleting, Jan. 1996.

"Bar Code Method for Automating Catalog Orders", IBM Technical Disclosure Bulletin, Sep. 1998.

"Bar-Code Recognition System Using Image Processing", Kuroki, Yoneoka et al., Hitachi Research Laborator.

* cited by examiner

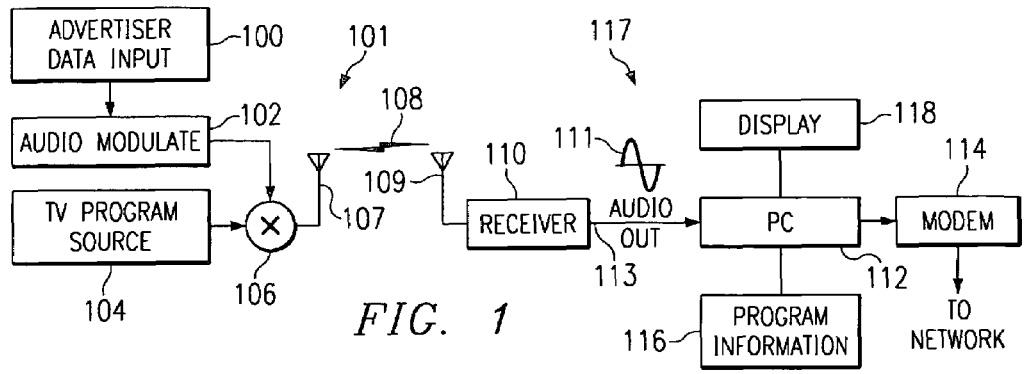
FIG. 1
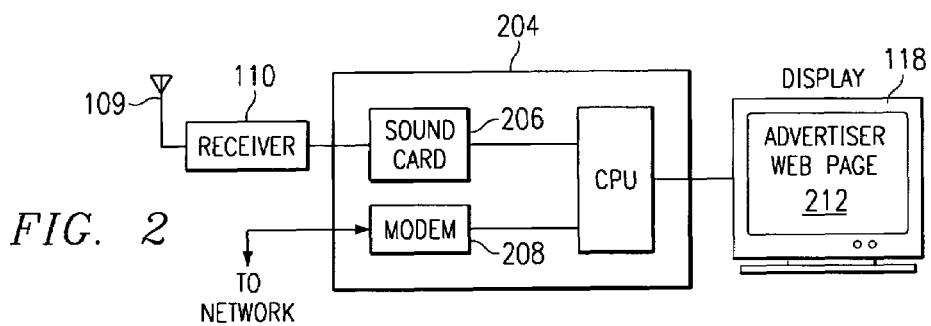
FIG. 2
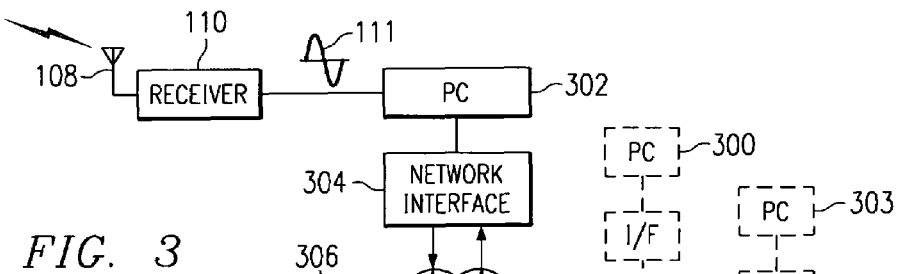
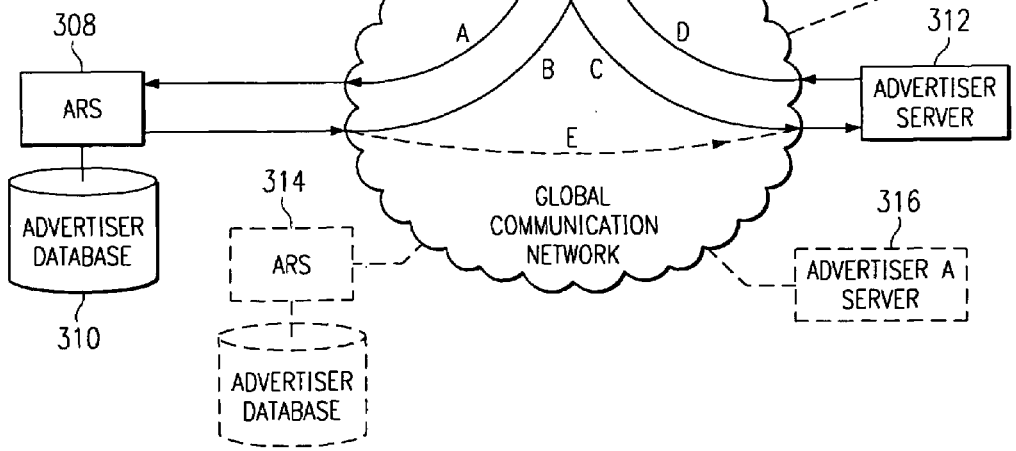
FIG. 3

PATH A: SOURCE TO ARS

| 400 | URL OF ARS | ADVERTISER PRODUCT CODE | URL OF SOURCE |

*FIG. 4a*

PATH B: ARS TO SOURCE

| 402 | URL OF SOURCE | URL OF ADVERTISER | URL OF ARS |

*FIG. 4b*

PATH C: SOURCE TO ADVERTISER

| 404 | URL OF ADVERTISER | REQUEST-FOR-INFORMATION | URL OF SOURCE |

*FIG. 4c*

PATH D: ADVERTISER TO SOURCE

| 406 | URL OF SOURCE | REQUESTED INFORMATION | URL OF ADVERTISER |

*FIG. 4d*

PATH E: ARS TO ADVERTISER (OPTIONAL)

| 408 | URL OF ADVERTISER | REQUEST-FOR-INFORMATION | URL OF SOURCE |

*FIG. 4e*

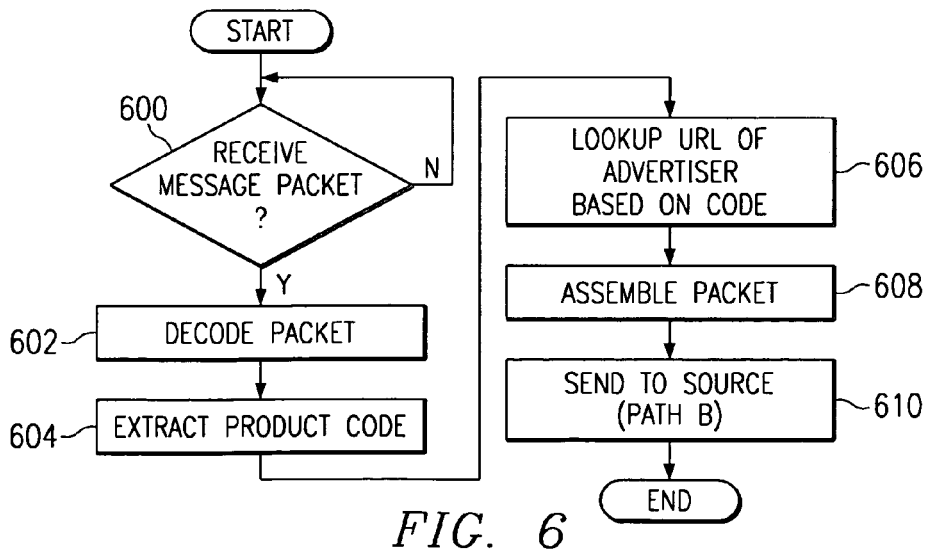

*FIG. 6*

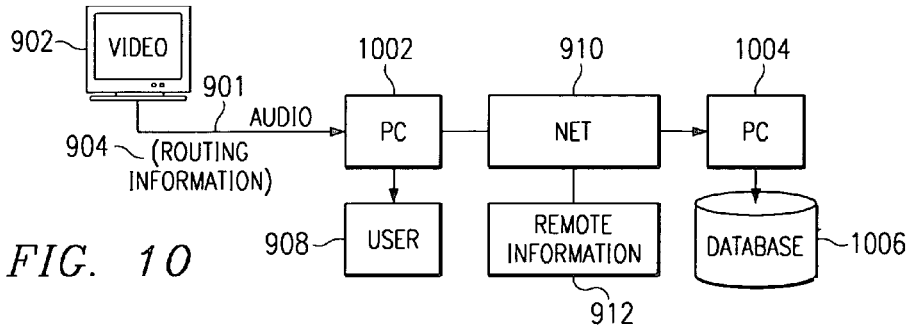
FIG. 10
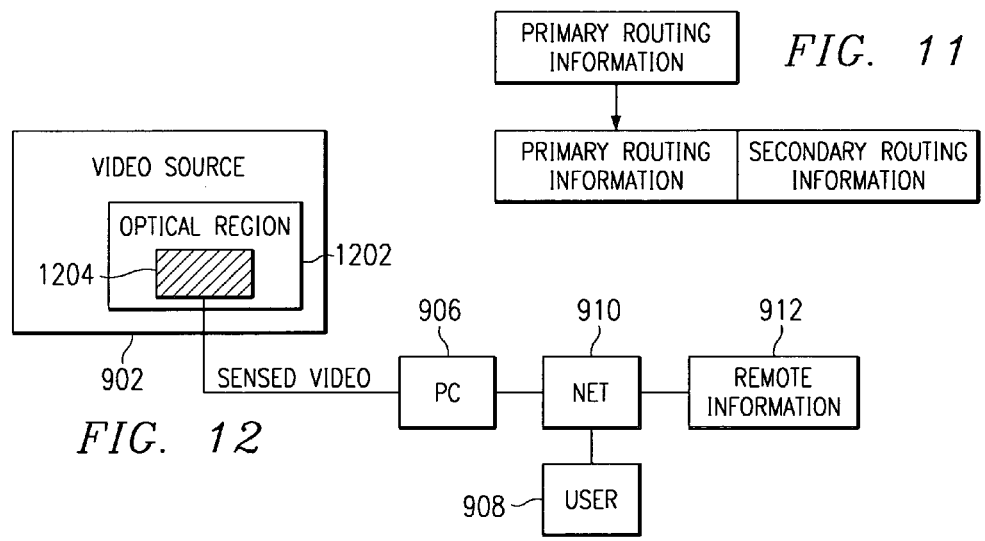
FIG. 11
FIG. 12
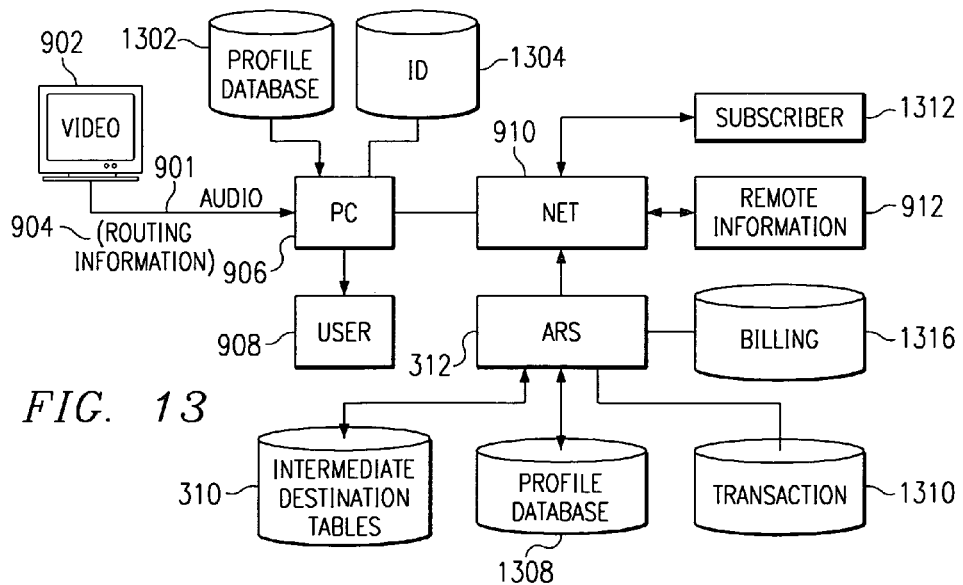
FIG. 13

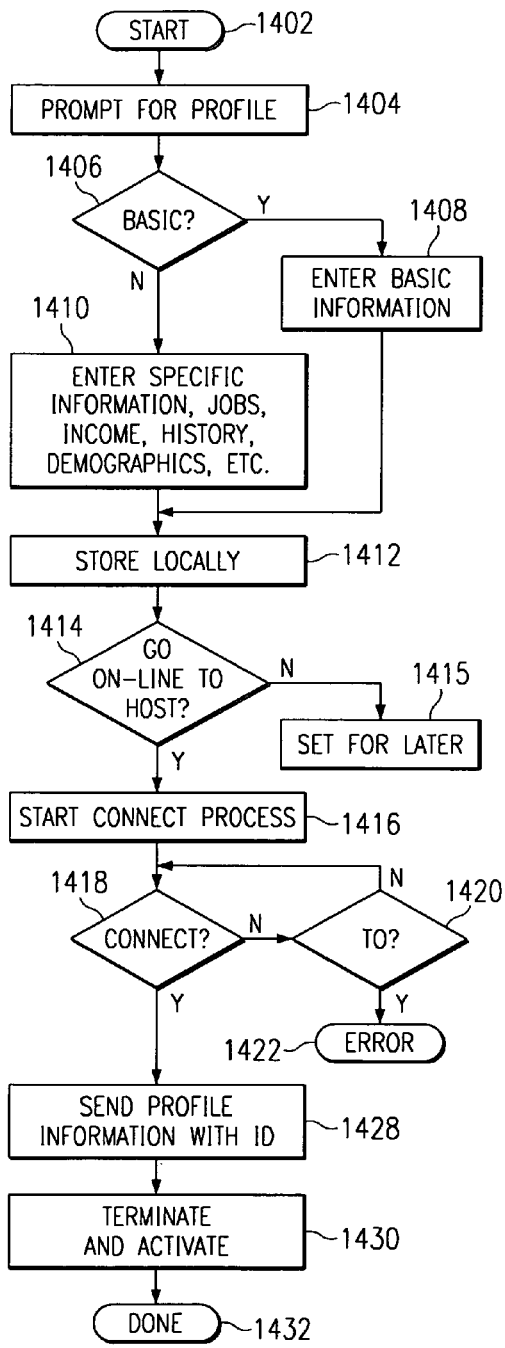
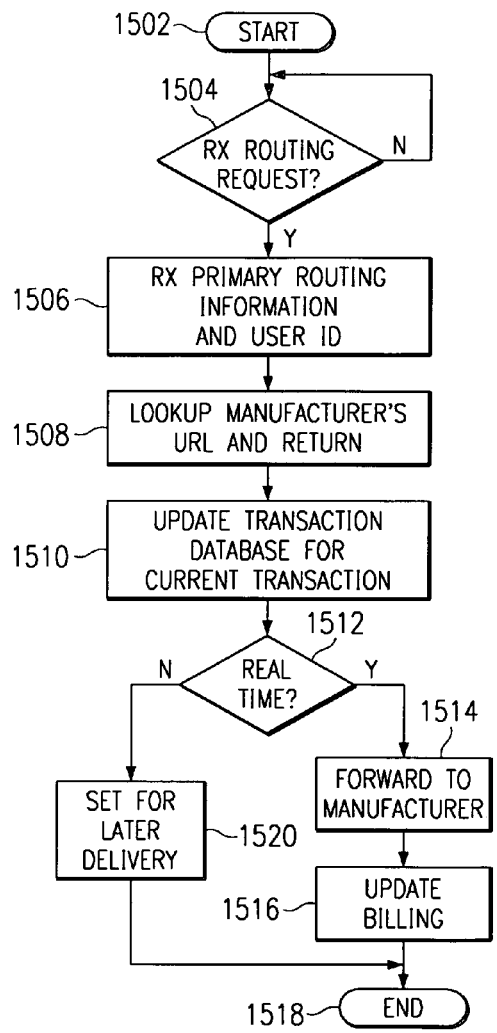
FIG. 14
FIG. 15

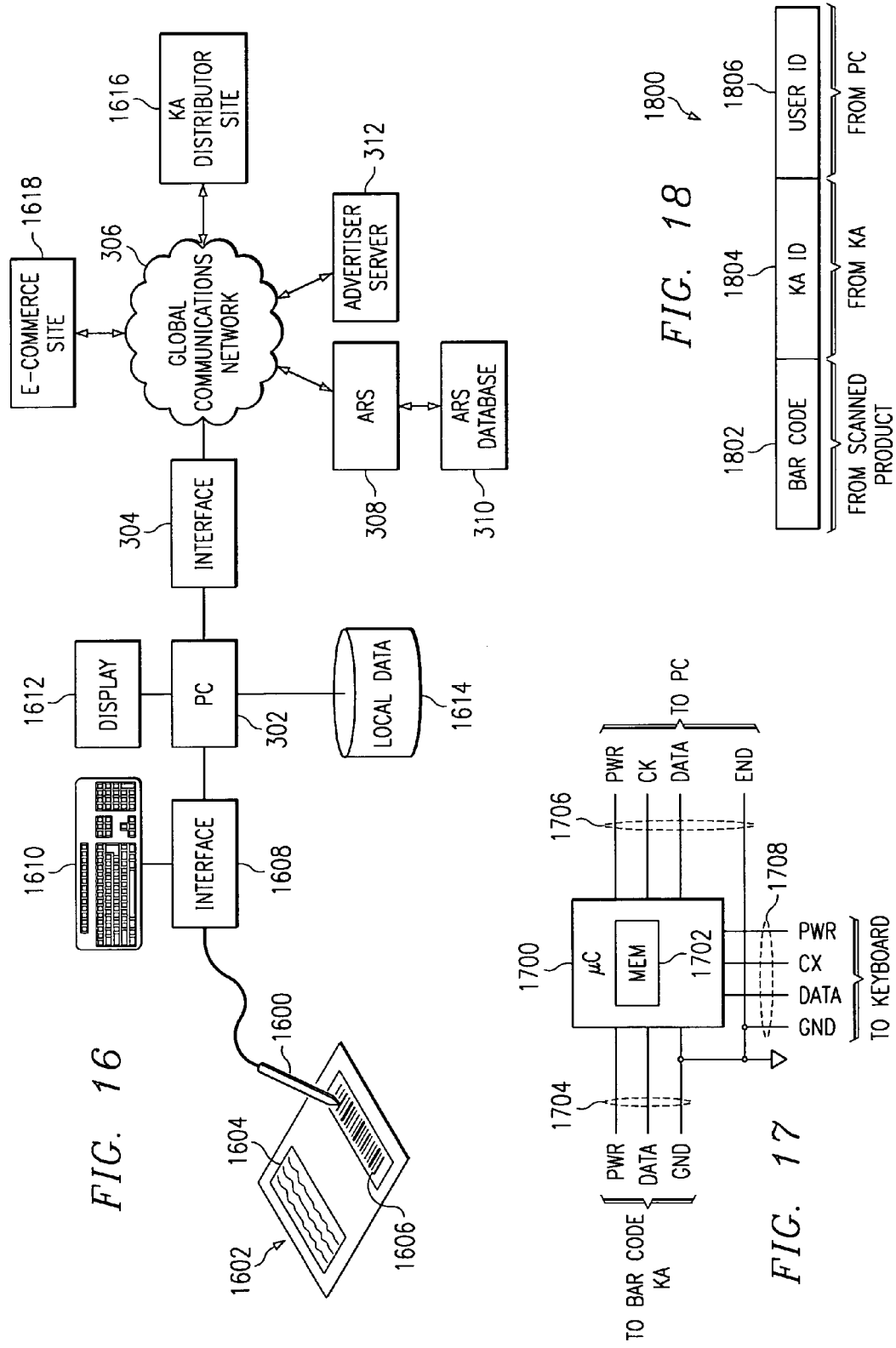

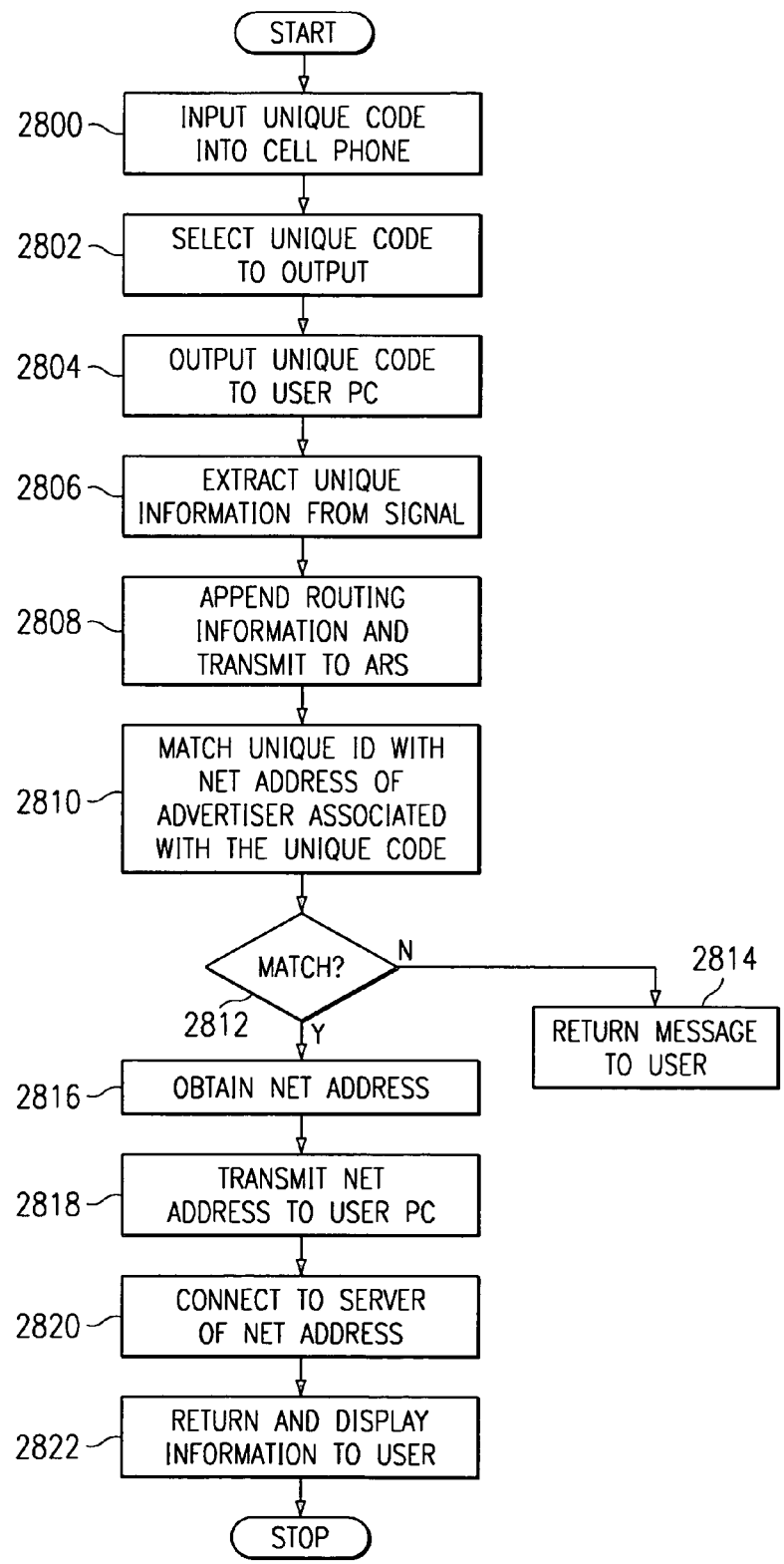

US 7,493,384 B1

CONTROLLING A PC USING A TONE FROM A CELLULAR TELEPHONE

CROSS-REFERENCE TO RELATED APPLICATIONS

This application is a Continuation-in-Part of U.S. patent application Ser. No. 09/378,221 entitled "METHOD AND APPARATUS FOR ACCESSING A REMOTE LOCATION BY SCANNING AN OPTICAL CODE" filed Aug. 19, 1999, now U.S. Pat. No. 6,745,234 issued on Jun. 1, 2004, which is a Continuation-In-Part of the following two U.S. patent applications Ser. No. 09/151,471 entitled "METHOD FOR INTERFACING SCANNED PRODUCT INFORMATION WITH A SOURCE FOR THE PRODUCT OVER A GLOBAL NETWORK" filed Sep. 11, 1998, now abandoned and Ser. No. 09/151,530 entitled "METHOD FOR CONTROLLING A COMPUTER WITH AN AUDIO SIGNAL" filed Sep. 11, 1998, and now issued on Aug. 1, 2000 as U.S. Pat. No. 6,098,106; and is related to U.S. patent application Ser. No. 09/627,197 entitled "CELLULAR TELEPHONE BATTERY PACK HAVING AN OPTICAL READER" filed on Jun. 22, 2000, now U.S. Pat. No. 7,089,291, issued on Aug. 8, 2006; each of which are hereby incorporated by reference.

TECHNICAL FIELD OF THE INVENTION

This invention is related to a method of controlling a computer, and more particularly to a method of controlling a computer using a tone from a cellular telephone.

BACKGROUND OF THE INVENTION

The explosion of the Internet has provided an enormous mechanism for reaching millions of potential customers. Web pages have become a major vehicle in providing Internet-based content (e.g., advertising) to users, and a convenient method for funneling the various users to desired locations on the network. However, creating sites that truly meet the needs and expectations of a wide range of online users and vendors, and the software engines that drive them, is quite another story.

The emergence of e-commerce over the Internet, and the scramble to capture the user's attention, if for only a brief moment, now demands more effective ways for vendors to present advertising to potential customers. There are a myriad of ways to design and present Web-based content. However, the numerous changes and updates required to present different products and information to the passing user become problematic and time consuming as the numbers of advertising vendors and products become large.

What is needed is an information architecture for making the Internet a far more appealing and effective medium for both the end-user and the vendor trying to reach that user through advertising.

SUMMARY OF THE INVENTION

The present invention disclosed and claimed herein, in one aspect thereof, comprises a method for accessing information over a network from a remote location on the network for delivery to a user PC. A cellular telephone is provided having a functional mode for web access over the network. A button on the phone is associated with the functional mode. The button on the phone is activated by a user to induce the functional mode when in proximity to the user PC. In response to activation of the functional mode, the user PC is controlled to access information from the remote location on the network for delivery to the user PC and display thereof to the user on a display associated with the user PC.

BRIEF DESCRIPTION OF THE DRAWINGS

For a more complete understanding of the present invention and the advantages thereof, reference is now made to the following description taken in conjunction with the accompanying Drawings in which:

FIG. 1 illustrates a block diagram of the preferred embodiment;

FIG. 2 illustrates the computer components employed in this embodiment;

FIG. 3 illustrates system interactions over a global network;

FIGS. 4a-4e illustrate the various message packets transmitted between the source PC and network servers used in the preferred embodiment;

FIG. 6 illustrates a flowchart of actions taken by the Advertiser Reference Server ("ARS") server;

FIG. 10 illustrates a more detailed, simplified block diagram of the embodiment of FIG. 9;

FIG. 11 illustrates a diagrammatic view of a method for performing the routing operation;

FIG. 12 illustrates a block diagram of an alternate embodiment utilizing an optical region in the video image for generating the routing information;

FIG. 13 illustrates a block diagram illustrating the generation of a profile with the disclosed embodiment;

FIG. 14 illustrates a flowchart for generating the profile and storing at the ARS;

FIG. 15 illustrates a flowchart for processing the profile information when information is routed to a user;

FIG. 16 illustrates a general block diagram of a disclosed embodiment;

FIG. 17 illustrates the conversion circuit of the wedge interface;

FIG. 18 illustrates a sample message packet transmitted from the user PC to the ARS;

FIG. 28 illustrates a flowchart of the process using the cellular telephone according to FIG. 27;

DETAILED DESCRIPTION OF THE INVENTION

Figures 5, 7:
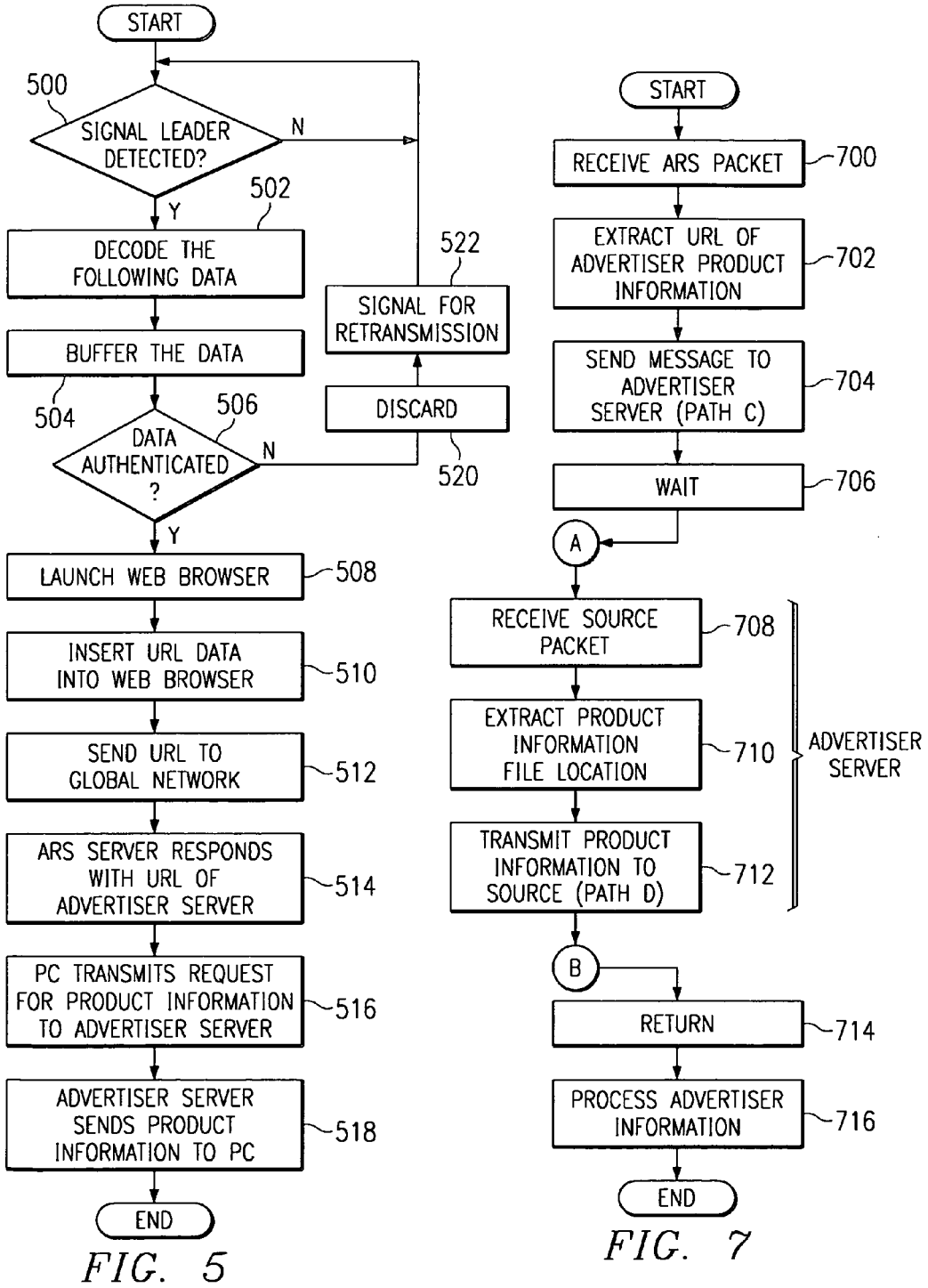
FIG. 5 is a flowchart depicting operation of the system according to the preferred embodiment.
FIG. 7 illustrates a flowchart of the interactive process between the source computer and ARS.

Referring now to FIG. 1, there is illustrated a block diagram of a system for controlling a personal computer ("PC") 112 via an audio tone transmitted over a wireless system utilizing a TV. In the embodiment illustrated in FIG. 1, there is provided a transmission station 101 and a receive station 117 that are connected via a communication link 108. The transmission station 101 is comprised of a television program source 104, which is operable to generate a program in the form of a broadcast signal comprised of video and audio. This is transmitted via conventional techniques along channels in the appropriate frequencies. The program source is input to a mixing device 106, which mixing device is operable to mix in an audio signal. This audio signal is derived from an audio source 100 which comprises a coded audio signal which is then modulated onto a carrier which is combined with the television program source 104. This signal combining can be done at the audio level, or it can even be done at the RF level in the form of a different carrier. However, the preferred method is to merely sum the audio signal from the modulator 102 into the audio channel of the program that is generated by the television program source 104. The output thereof is provided from the mixing device 106 in the form of broadcast signal to an antenna 107, which transmits the information over the communication link 108 to an antenna 109 on the receive side.

On the receive side of the system, a conventional receiver 110, such as a television is provided. This television provides a speaker output which provides the user with an audible signal. This is typically associated with the program. However, the receiver 110 in the disclosed embodiment, also provides an audio output jack, this being the type RCA jack. This jack is utilized to provide an audio output signal on a line 113 which is represented by an audio signal 111. This line 113 provides all of the audio that is received over the communication link 108 to the PC 112 in the audio input port on the PC 112. However, it should be understood that, although a direct connection is illustrated from the receiver 110 to the PC 112, there actually could be a microphone pickup at the PC 112 which could pick the audio signal up. In the disclosed embodiment, the audio signal generated by the advertiser data input device 100 is audible to the human ear and, therefore, can be heard by the user. Therefore, no special filters are needed to provide this audio to the PC 112.

The PC 112 is operable to run programs thereon which typically are stored in a program file area 116. These programs can be any type of programs such as word processing programs, application programs, etc. In the disclosed embodiment, the program that is utilized in the system is what is referred to as a "browser." The PC 112 runs a browser program to facilitate the access of information on the network, for example, a global communication network known as the "Internet" or the World-Wide-Web ("Web"). The browser is a hypertext-linked application used for accessing information. Hypertext is a term used to describe a particular organization of information within a data processing system, and its presentation to a user. It exploits the computer's ability to link together information from a wide variety of sources to provide the user with the ability to explore a particular topic.

The traditional style of presentation used in books employs an organization of the information which is imposed upon it by limitations of the medium, namely fixed sized, sequential paper pages. Hypertext systems, however, use a large number of units of text or other types of data such as image information, graphical information, video information, or sound information, which can vary in size. A collection of such units of information is termed a hypertext document, or where the hypertext documents employ information other than text, hypermedia documents. Multimedia communications may use the Hypertext Transfer Protocol ("HTTP"), and files or formatted data may use the Hypertext Markup Language ("HTML"). This formatting language provides for a mingling of text, graphics, sound, video, and hypertext links by "tagging" a text document using HTML. Data encoded using HTML is often referred to as an "HTML document," an "HTML page," or a "home page." These documents and other Internet resources may be accessed across the network by means of a network addressing scheme which uses a locator referred to as a Uniform Resource Locator ("URL"), for example, "http://www.digital.com."

The Internet is one of the most utilized networks for interconnecting distributed computer systems and allows users of these computer systems to exchange data all over the world. Connected to the Internet are many private networks, for example, corporate or commercial networks. Standard protocols, such as the Transport Control Protocol ("TCP") and the Internet Protocol ("IP") provide a convenient method for communicating across these diverse networks. These protocols dictate how data are formatted and communicated. As a characteristic of the Internet, the protocols are layered in an IP stack. At higher levels of the IP stack, such as the application layer (where HTTP is employed), the user information is more readily visible, while at lower levels, such as the network level (where TCP/IP are used), the data can merely be observed as packets or a stream of rapidly moving digital signals. Superimposed on the Internet is a standard protocol interface for accessing Web resources, such as servers, files, Web pages, mail messages, and the like. One way that Web resources can be accessed is by browsers made by Netscape® and Microsoft Internet Explorer®.

Referring again now to FIG. 1, the user can load this program with the appropriate keystrokes such that a browser window will be displayed on a display 118. In one embodiment, the user can run the browser program on the PC 112 such that the browser window is displayed on the display 118. While watching a preferred program, the user can also view display 118. When an audio signal is received by the receiver 110 and the encoded information is contained therein that was input thereto by the advertiser, the PC 112 will then perform a number of operations. The first operation, according to the disclosed embodiment, is to extract the audio information within the received audio signal in the form of digital data, and then transmit this digital data to a defined location on the global communication network via a modem connection 114. This connection will be described hereinbelow. This information will be relayed to a proprietary location and the instructions sent back to the PC 112 as to the location of the advertiser associated with the code, and the PC 112 will then effect a communication link to that location such that the user can view on the display 118 information that the advertiser, by the fact of putting the tone onto the broadcast channel, desires the viewer to view. This information can be in the form of interactive programs, data files, etc. In one example, when an advertisement appears on the television, the tone can be generated and then additional data displayed on the display 118. Additionally, a streaming video program could be played on the PC received over the network, which streaming video program is actually longer than the advertising segment on the broadcast. Another example would be a sports game that would broadcast the tone in order to allow a user access to information that is not available over the broadcast network, such as additional statistics associated with the sports program, etc.

By utilizing the system described herein with respect to the disclosed embodiment of FIG. 1, an advertiser is allowed the ability to control a user's PC 112 through the use of tones embedded within a program audio signal. As will described hereinbelow, the disclosed embodiment utilizes particular routing information stored in the PC 112 which allows the encoded information in the received audio signal to route this information to a desired location on the network, and then allow other routing information to be returned to the PC 112 for control thereof to route the PC 112 to the appropriate location associated with that code.

Referring now to FIG. 2, there is illustrated a computer 204, similar to computer 112, connected to display information on display 118. The computer 204 comprises an internal audio or "sound" card 206 for receiving the transmitted audio signal through receive antenna 109 and receiver 110. The sound card 206 typically contains analog-to-digital circuitry for converting the analog audio signal into a digital signal. The digital signal may then be more easily manipulated by software programs. The receiver 110 separates the audio signal from the video signal. A special trigger signal located within the transmitted advertiser audio signal triggers proprietary software running on the computer 204 which launches a communication application, in this particular embodiment, the web browser application located on the PC 204. Coded advertiser information contained within the audio signal is then extracted and appended with the address of a proprietary server located on the communication network. The remote server address is in the form of a URL.

This appended data, in addition to other control codes, is inserted directly into the web browser application for automatic routing to the communication network. The web browser running on PC 204, and communicating to the network with an internal modem 208, in this embodiment, transmits the advertiser information to the remote server. The remote server cross-references the advertiser product information to the address of the advertiser server located on the network. The address of the advertiser server is routed back through the PC 204 web browser to the advertiser server. The advertiser product information is returned to PC 204 to be presented to the viewer on display 118. In this particular embodiment, the particular advertiser product information displayed is contained within the advertiser's web page 212. As mentioned above, the audio signal is audible to the human ear. Therefore the audio signal, as emitted from the TV speakers, may be input to the sound card 206 via a microphone. Furthermore, the audio signal need not be a real-time broadcast, but may be on video tapes, CDs, DVD, or other media which may be displayed at a later date. With the imminent implementation of high definition digital television, the audio signal output from the TV may also be digital. Therefore, direct input into a sound card for A/D purposes may not be necessary, but alternative interfacing techniques to accommodate digital-to-digital signal formats would apply.

Referring now to FIG. 3, there is illustrated a source PC 302, similar to PCs 204 and 112, connected to a global communication network (GCN) 306 through an interface 304. In this embodiment, the audio signal 111 is received by PC 302 through its sound card 206. The audio signal 111 comprises a trigger signal which triggers proprietary software into launching a web browser application residing on the PC 302. The audio signal 111 also comprises advertiser product information which is extracted and appended with URL information of an Advertiser Reference Server ("ARS") 308. The ARS 308 is a system disposed on the network 306 that is defined as the location to which data in the audio signal 111 is to be routed. As such, data in the audio signal 111 will always be routed to the ARS 308, since a URL is unique on the GCN 306. Connected to the ARS 308 is a database 310 of product codes and associated manufacturer URLs. The database 310 undergoes a continual update process which is transparent to the user. As companies sign-on, i.e., subscribe to this technology, manufacturer and product information are added to the database 310 without interrupting operation of the source PC 302 with frequent updates. When the advertiser server address URL is obtained from the ARS database 310, it and the request for the particular advertiser product information is automatically routed back through the web browser on PC 302, over to the respective advertiser server for retrieval of the advertiser product information to the PC 302. Additionally, although the disclosed invention discusses a global communication network, the system is also applicable to LANs, WANs, and peer-to-peer network configurations. It should be noted that the disclosed architecture is not limited to a single source PC 302, but may comprise a plurality of source PCs, e.g., PC 300 and PC 303. Moreover, a plurality of ARS 308 systems and advertiser servers 312 may be implemented, e.g., ARS 314, and advertiser server A 316, respectively.

The information transactions, in general, which occur between the networked systems of this embodiment, over the communication network, are the following. The web browser running on source PC 302 transmits a message packet to the ARS 308 over Path "A." The ARS 308 decodes the message packet and performs a cross-reference function with product information extracted from the received message packet to obtain the address of an advertiser server 312. A new message packet is assembled comprising the advertiser server 312 address, and sent back to the source PC 302 over Path "B." A "handoff" operation is performed whereby the source PC 302 browser simply reroutes the information on to the advertiser server 312 over Path "C," with the appropriate source and destination address appended. The advertiser server 312 receives and decodes the message packet. The request-for-advertiser-product-information is extracted and the advertiser 312 retrieves the requested information from its database for transmission back to the source PC 302 over Path "D." The source PC 302 then processes the information, i.e., for display to the viewer. The optional Path "E" is discussed hereinbelow. It should be noted that the disclosed methods are not limited to only browser communication applications, but may accommodate, with sufficient modifications by one skilled in the art, other communication applications used to transmit information over the Internet or communication network.

Referring now to FIG. 4a, the message packet 400 sent from the source PC 302 to ARS 308 via Path "A" comprises several fields. One field comprises the URL of the ARS 308 which indicates where the message packet is to be sent. Another field comprises the advertiser product code or other information derived from the audio signal 111, and any additional overhead information required for a given transaction. The product code provides a link to the address of the advertiser server 312, located in the database 310. Yet another field comprises the network address of the source PC 302. In general, network transmissions are effected in packets of information, each packet providing a destination address, a source address, and data. These packets vary depending upon the network transmission protocol utilized for communication. Although the protocols utilized in the disclosed embodiment are of a conventional protocol suite commonly known as TCP/IP, it should be understood that any protocols providing the similar basic functions can be used, with the primary requirement that a browser can forward the routing information to the desired URL in response to keystrokes being input to a PC. Within the context of this disclosure, "message packet" shall refer to and comprise the destination URL, product information, and source address, even though more than a single packet must be transmitted to effect such a transmission.

Upon receipt of the message packet 400 from source PC 302, ARS 308 processes the information in accordance with instructions embedded in the overhead information. The ARS 308 specifically will extract the product code information from the received packet 400 and, once extracted, will then decode this product code information. Once decoded, this information is then compared with data contained within the ARS advertiser database 310 to determine if there is a "hit." If there is no "hit" indicating a match, then information is returned to the browser indicating such. If there is a "hit," a packet 402 is assembled which comprises the address of the source PC 302, and information instructing the source PC 302 as to how to access, directly in a "handoff" operation, another location on the network, that of an advertiser server 312. This type of construction is relatively conventional with browsers such as Netscape® and Microsoft Internet Explores and, rather than displaying information from the ARS 308, the source PC 302 can then access the advertiser server 312. The ARS 308 transmits the packet 402 back to source PC 302 over Path "B." Referring now to FIG. 4b, the message packet 402 comprises the address of the source PC 302, the URL of the advertiser server 312 embedded within instructional code, and the URL of the ARS 308.

Upon receipt of the message packet 402 by the source PC 302, the message packet 402 is disassembled to obtain pertinent routing information for assembly of a new message packet 404. The web browser running on source PC 302 is now directed to obtain, over Path "C," the product information relevant to the particular advertiser server 312 location information embedded in message packet 404. Referring now to FIG. 4c, the message packet 404 for this transaction comprises the URL of the advertiser server 312, the request-for-product-information data, and the address of the source PC 302.

Upon receipt of the message packet 404 from source PC 302, advertiser server 312 disassembles the message packet 404 to obtain the request-for-product-information data. The advertiser server 312 then retrieves the particular product information from its database, and transmits it over Path "D" back to the source PC 302. Referring now to FIG. 4d, the message packet 406 for this particular transaction comprises the address of the source PC 302, the requested information, and the URL of the advertiser server 312.

Optionally, the ARS 308 may make a direct request for product information over Path "E" to advertiser server 312. In this mode, the ARS 308 sends information to the advertiser server 312 instructing it to contact the source PC 302. This, however, is unconventional and requires more complex software control. The message packet 408 for this transaction is illustrated in FIG. 4e, which comprises the URL of the advertiser server 312, the request-for-product-information data, and the address of the source PC 302. Since product information is not being returned to the ARS 308, but directly to the source PC 302, the message packet 408 requires the return address to be that of the source PC 302. The product information is then passed directly to PC 302 over Path "D."

Referring now to FIG. 5, the method for detecting and obtaining product information is as follows. In decision block 500, a proprietary application running resident on a source computer PC 302 (similar to PC 204) monitors the audio input for a special trigger signal. Upon detection of the trigger signal, data following the trigger signal is decoded for further processing, in function block 502. In function block 504, the data is buffered for further manipulation. In decision block 506, a determination is made as to whether the data can be properly authenticated. If not, program flow continues through the "N" signal to function block 520 where the data is discarded. In function block 522, the program then signals for a retransmission of the data. The system then waits for the next trigger signal, in decision block 500. If properly authenticated in decision block 506, program flow continues through the "Y" signal path where the data is then used to launch the web browser application, as indicated in function block 508. In function block 510, the web browser receives the URL data, which is then automatically routed through the computer modem 208 to the network interface 304 and ultimately to the network 306. In function block 514, the ARS 308 responds by returning the URL of advertiser server 312 to the PC 302. In function block 516, the web browser running on the source PC 302, receives the advertiser URL information from the ARS 308, and transmits the URL for the product file to the advertiser server 312. In block 518, the advertiser server 312 responds by sending the product information to the source PC 302 for processing. The user may obtain the benefits of this architecture by simply downloading the proprietary software over the network. Other methods for obtaining the software are well-known; for example, by CD, diskette, or pre-loaded hard drives.

Referring now to FIG. 6, there is illustrated a flowchart of the process the ARS 308 may undergo when receiving the message packet 400 from the source PC 302. In decision block 600, the ARS 308 checks for the receipt of the message packet 400. If a message packet 400 is not received, program flow moves along the "N" path to continue waiting for the message. If the message packet 400 is received, program flow continues along path "Y" for message processing. Upon receipt of the message packet 400, in function block 602, the ARS 308 decodes the message packet 400. The product code is then extracted independently in function block 604 in preparation for matching the product code with the appropriate advertiser server address located in the database 310. In function block 606, the product code is then used with a lookup table to retrieve the advertiser server 312 URL of the respective product information contained in the audio signal data. In function block 608, the ARS 308 then assembles message packet 402 for transmission back to the source PC 302. Function block 610 indicates the process of sending the message packet 402 back to the source PC 302 over Path "B."

Referring now to FIG. 7, there is illustrated a flowchart of the interactive processes between the source PC 302 and the advertiser server 312. In function block 700, the source PC 302 receives the message packet 402 back from the ARS 308 and begins to decode the packet 402. In function block 702, the URL of the advertiser product information is extracted from the message packet 402 and saved for insertion into the message packet 404 to the advertiser server 312. The message packet 404 is then assembled and sent by the source PC 302 over Path "C" to the advertiser server 312, in function block 704. While the source PC 302 waits, in function block 706, the advertiser server 312 receives the message packet 404 from the source PC 302, in function block 708, and disassembles it. The product information location is then extracted from the message packet 404 in function block 710. The particular product information is retrieved from the advertiser server 312 database for transmission back to the source PC 302. In function block 712, the product information is assembled into message packet 406 and then transmitted back to the source PC 302 over Path "D." Returning to the source PC 302 in function block 714, the advertiser product information contained in the message packet 406 received from the advertiser server 312, is then extracted and processed in function block 716.

Figure 8:
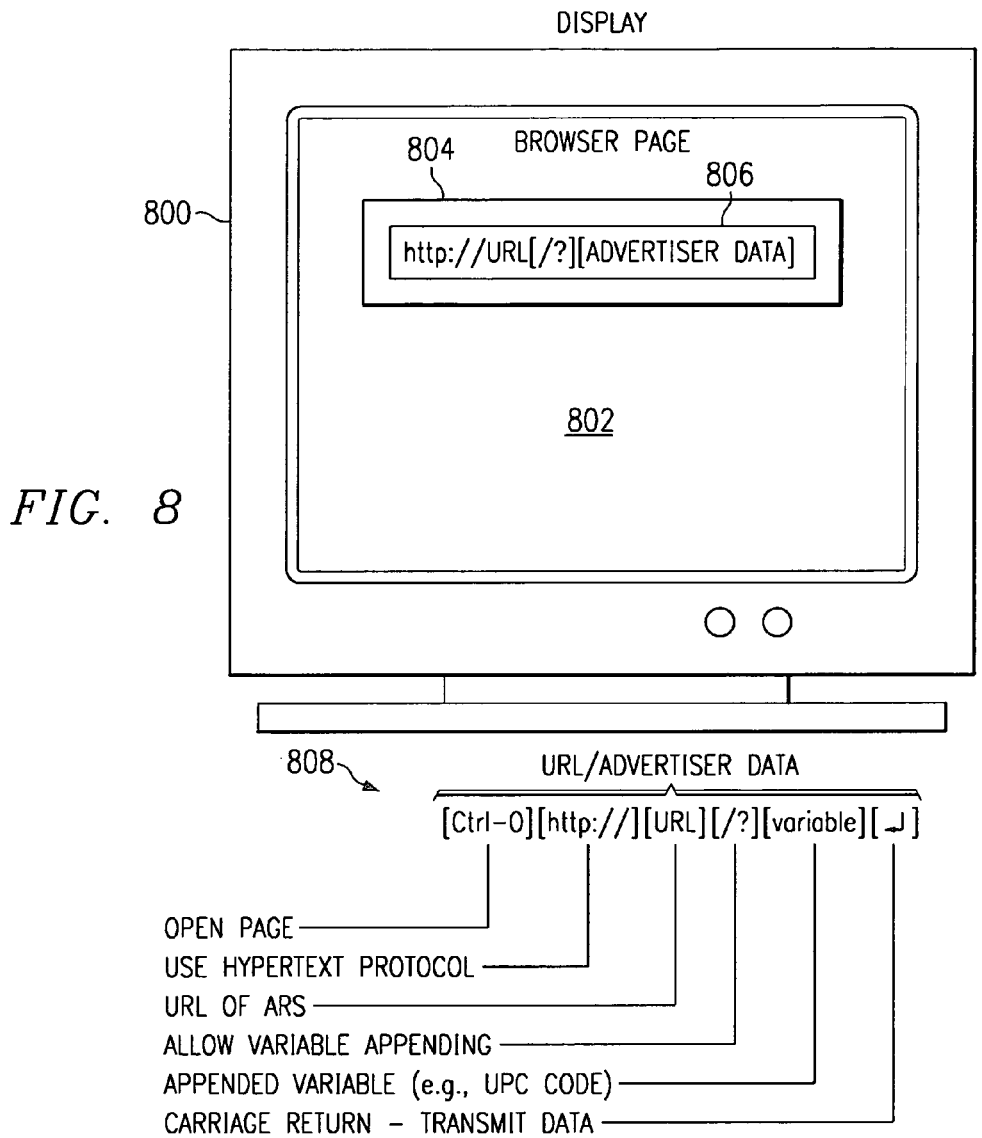
FIG. 8 illustrates a web browser page receiving the modified URL/advertiser product data according to the preferred embodiment.

Referring now to FIG. 8, after receipt of a trigger signal, a web browser application on a source PC 302 is automatically launched and computer display 800 presents a browser page 802. Proprietary software running on the source PC 302 processes the audio signal data after being digitized through the sound card 206. The software appropriately prepares the data for insertion directly into the web browser by extracting the product information code and appending keystroke data to this information. First, a URL page 804 is opened in response to a Ctrl-O command added by the proprietary software as the first character string. Opening URL page 804 automatically positions the cursor in a field 806 where additional keystroke data following the Ctrl-O command will be inserted. After URL page 804 is opened, the hypertext protocol preamble http:// is inserted into the field 806. Next, URL information associated with the location of the ARS 308 is inserted into field 806. Following the ARS 308 URL data are the characters /? to allow entry of variables immediately following the /? characters. In this embodiment, the variable following is the product information code received in the audio signal. The product code information also provides the cross-reference information for obtaining the advertiser URL from the ARS database 310. Next, a carriage return is added to send the URL/product data and close the window 804. After the message packet 400 is transmitted to the ARS 308 from the source PC 302, transactions from the ARS 308, to the source PC 302, to the advertiser server 312, and back to the source PC 302, occur quickly and are transparent to the viewer. At this point, the next information the viewer sees is the product information which was received from the advertiser server 312.

Figure 9:
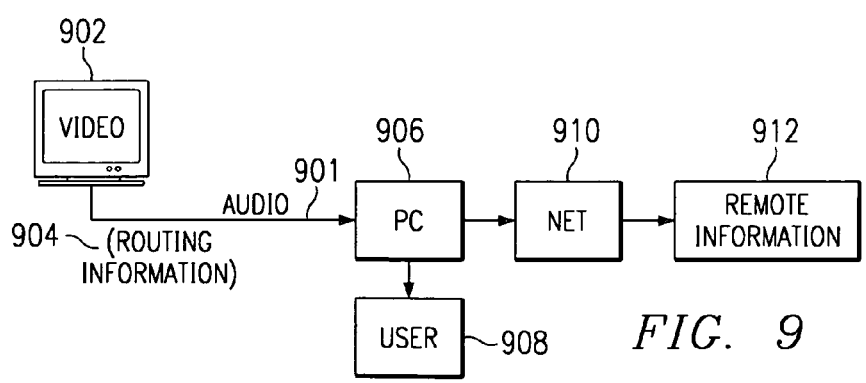
FIG. 9 illustrates a simplified block diagram of the disclosed embodiment.

Referring now to FIG. 9, there is illustrated a block diagram of a more simplified embodiment. In this embodiment, a video source 902 is provided which is operable to provide an audio output on an audio cable 901 which provides routing information referred to by reference numeral 904. The routing information 904 is basically information contained within the audio signal. This is an encoded or embedded signal. The important aspect of the routing information 904 is that it is automatically output in realtime as a function of the broadcast of the video program received over the video source 902. Therefore, whenever the program is being broadcast in realtime to the user 908, the routing information 904 will be output whenever the producer of the video desires it to be produced. It should be understood that the box 902 representing the video source could be any type of media that will result in the routing information being output. This could be a cassette player, a DVD player, an audio cassette, a CD ROM or any such media. It is only important that this is a program that the producer develops which the user 908 watches in a continuous or a streaming manner. Embedded within that program, at a desired point selected by the producer, the routing information 904 is output.

The audio information is then routed to a PC 906, which is similar to the PC 112 in FIG. 1. A user 908 is interfaced with the PC to receive information thereof, the PC 906 having associated therewith a display (not shown). The PC 906 is interfaced with a network 910, similar to the network 306 in FIG. 3. This network 910 has multiple nodes thereon, one of which is the PC 906, and another of which is represented by a network node 912 which represents remote information. The object of the present embodiment is to access remote information for display to the user 908 by the act of transmitting from the video program in block 902 the routing information 904. This routing information 904 is utilized to allow the PC 906 which has a network "browser" running thereon to "fetch" the remote information at the node 912 over the network 910 for display to the user 908. This routing information 904 is in the form of an embedded code within the audio signal, as was described hereinabove.

Referring now to FIG. 10, there is illustrated a more detailed block diagram of the embodiment of FIG. 9. In this embodiment, the PC 906 is split up into a couple of nodes, a first PC 1002 and a second PC 1004. The PC 1002 resides at the node associated with the user 908, and the PC 1004 resides at another node. The PC 1004 represents the ARS 308 of FIG. 3. The PC 1004 has a database 1006 associated therewith, which is basically the advertiser database 310. Therefore, there are three nodes on the network 910 necessary to implement the disclosed embodiment, the PC 1002, the PC 1004 and the remote information node 912. The routing information 904 is utilized by the PC 1002 for routing to the PC 1004 to determine the location of the remote information node 912 on the network 910. This is returned to the PC 1002 and a connection made directly with the remote information node 912 and the information retrieved therefrom to the user 908. The routing information 904 basically constitutes primary routing information.

Referring now to FIG. 11, there is illustrated a diagrammatic view of how the network packet is formed for sending the primary routing information to the PC 1004. In general, the primary routing information occupies a single field which primary routing information is then assembled into a data packet with the secondary routing information for transfer to the network 910. This is described hereinabove in detail.

Referring now to FIG. 12, there is illustrated an alternate embodiment to that of FIG. 9. In this embodiment, the video source 902 has associated therewith an optical region 1202, which optical region 1202 has disposed therein an embedded video code. This embedded video code could be relatively complex or as simple as a grid of dark and white regions, each region in the grid able to have a dark color for a logic "1" or a white region for a logic "0." This will allow a digital value to be disposed within the optical region 1202. A sensor 1204 can then be provided for sensing this video code. In the example above, this would merely require an array of optical detectors, one for each region in the grid to determine whether this is a logic "1" or a logic "0" state. One of the sensed video is then output to the PC 906 for processing thereof to determine the information contained therein, which information contained therein constitutes the primary routing information 904. Thereafter, it is processed as described hereinabove with reference to FIG. 9.

Referring now to FIG. 13, there is illustrated a block diagram for an embodiment wherein a user's profile can be forwarded to the original subscriber or manufacturer. The PC 906 has associated therewith a profile database 1302, which profile database 1302 is operable to store a profile of the user 908. This profile is created when the program, after initial installation, requests profile information to be input in order to activate the program. In addition to the profile, there is also a unique ID that is provided to the user 908 in association with the browser program that runs on the PC 906. This is stored in a storage location represented by a block 1304. This ID 1304 is accessible by a remote location as a "cookie" which is information that is stored in the PC 906 in an accessible location, which accessible location is actually accessible by the remote program running on a remote node.

The ARS 308, which basically constitutes the PC 1004 of FIG. 10, is operable to have associated therewith a profile database 1308, which profile database 1308 is operable to store profiles for all of the users. The profile database 1308 is a combination of the information stored in profile database 1302 for all of the PCs 906 that are attachable to the system. This is to be distinguished from information stored in the database 310 of the ARS 308, the advertiser's database, which contains intermediate destination tables. When the routing information in the primary routing information 904 is forwarded to the ARS 308 and extracted from the original data packet, the lookup procedure described hereinabove can then be performed to determine where this information is to be routed. The profile database 1302 is then utilized for each transaction, wherein each transaction in the form of the routing information received from the primary routing information 904 is compared to the destination tables of database 310 to determine what manufacturer is associated therewith.

The associated ID 1304 that is transmitted along with the routing information in primary routing information 904 is then compared with the profile database 1308 to determine if a profile associated therewith is available. This information is stored in a transaction database 1310 such that, at a later time, for each routing code received in the form of the information in primary routing information 904, there will associated therewith the IDs 1304 of each of the PCs 906. The associated profiles in database 1308, which are stored in association with IDs 1304, can then be assembled and transmitted to a subscriber as referenced by a subscriber node 1312 on the network 910. The ARS 308 can do this in two modes, a realtime mode or a non-realtime mode. In a realtime mode, each time a PC 906 accesses the advertiser database 310, that user's profile information is uploaded to the subscriber node 1312. At the same time, billing information is generated for that subscriber 1312 which is stored in a billing database 1316. Therefore, the ARS 308 has the ability to inform the subscriber 1312 of each transaction, bill for those transactions, and also provide to the subscriber 1312 profile information regarding who is accessing the particular product advertisement having associated therewith the routing information field 904 for a particular routing code as described hereinabove. This information, once assembled, can then be transmitted to the subscriber 1312 and also be reflected in billing information and stored in the billing information database 1316.

Referring now to FIG. 14, there is illustrated a flowchart depicting the operation for storing the profile for the user. The program is initiated in a block 1402 and then proceeds to a function block 1404, wherein the system will prompt for the profile upon initiation of the system. This initiation is a function that is set to activate whenever the user initially loads the software that he or she is provided. The purpose for this is to create, in addition to the setup information, a user profile. Once the user is prompted for this, then the program will flow to a decision block 1406 to determine whether the user provides basic or detailed information. This is selectable by the user. If selecting basic, the program will flow to a function block 1408 wherein the user will enter basic information such as name and serial number and possibly an address. However, to provide some incentive to the user to enter more information, the original prompt in function block 1404 would have offers for such things as coupons, discounts, etc., if the user will enter additional information. If the user selects this option, the program flows from the decision block 1406 to a function block 1410. In the function block 1410, the user is prompted to enter specific information such as job, income level, general family history, demographic information and more. There can be any amount of information collected in this particular function block.

Once all of the information is collected, in either the basic mode or the more specific mode, the program will then flow to a function block 1412 where this information is stored locally. The program then flows to a decision block 1414 to then go on-line to the host or the ARS 308. In general, the user is prompted to determine whether he or she wants to send this information to the host at the present time or to send it later. If he or she selects the "later" option, the program will flow to a function block 1415 to prompt the user at a later time to send the information. In the disclosed embodiment, the user will not be able to utilize the software until the profile information is sent to the host. Therefore, the user may have to activate this at a later time in order to connect with the host.

If the user has selected the option to upload the profile information to the host, the program will flow to the function block 1416 to initiate the connect process and then to a decision block 1418 to determine if the connection has been made. If not, the program will flow along a "N" path to a decision block 1420 which will timeout to an error block 1422 or back to the input of the connect decision block 1418. The program, once connected, will then flow along a "Y" path from decision block 1418 to a function block 1428 to send the profile information with the ID of the computer or user to the host. The ID is basically, as described hereinabove, a "cookie" in the computer which is accessed by the program when transmitting to the host. The program will then flow to a function block 1430 to activate the program such that it, at later time, can operate without requiring all of the setup information. In general, all of the operation of this flowchart is performed with a "wizard" which steps the user through the setup process. Once complete, the program will flow to a Done block 1432.

Referring now to FIG. 15, there is illustrated a flowchart depicting the operation of the host when receiving a transaction. The program is initiated at a Start block 1502 and then proceeds to decision block 1504, wherein it is determined whether the system has received a routing request, i.e., the routing information 904 in the form of a tone, etc., embedded in the audio signal, as described hereinabove with respect to FIG. 9. The program will loop back around to the input of decision block 1504 until the routing request has been received. At this time, the program will flow along the "Y" path to a function block 1506 to receive the primary routing information and the user ID. Essentially, this primary routing information is extracted from the audio tone, in addition to the user ID. The program then flows to a function block 1508 to lookup the manufacturer URL that corresponds to the received primary routing information and then return the necessary command information to the originating PC 112 in order to allow that PC 112 to connect to the destination associated with the primary routing information. Thereafter, the program will flow to a function block 1510 to update the transaction database 1310 for the current transaction. In general, the routing information 904 will be stored as a single field with the associated IDs. The profile database 1308, as described hereinabove, has associated therewith detailed profiles of each user on the system that has activated their software in association with their ID. Since the ID was sent in association with the routing information, what is stored in the transaction database 1310 is the routing code, in association with all of the IDs transmitted to the system in association with that particular routing code. Once this transaction database 1310 has been updated, as described hereinabove, the transactions can be transferred back to the subscriber at node 312 with the detailed profile information from the profile database 1308.

The profile information can be transmitted back to the subscriber or manufacturer at the node 312 in realtime or non-realtime. A decision block 1512 is provided for this, which determines if the delivery is realtime. If realtime, the program will flow along a "Y" path to a function block 1514 wherein the information will be immediately forwarded to the manufacturer or subscriber. The program will then flow to a function block 1516 wherein the billing for that particular manufacturer or subscriber will be updated in the billing database 1316. The program will then flow into an End block 1518. If it was non-realtime, the program moves along the "N" path to a function block 1520 wherein it is set for a later delivery and it is accrued in the transaction database 1310. In any event, the transaction database 1310 will accrue all information associated with a particular routing code.

With a realtime transaction, it is possible for a manufacturer to place an advertisement in a magazine or to place a product on a shelf at a particular time. The manufacturer can thereafter monitor the times when either the advertisements are or the products are purchased. Of course, they must be scanned into a computer which will provide some delay. However, the manufacturer can gain a very current view of how a product is moving. For example, if a cola manufacturer were to provide a promotional advertisement on, for example, television, indicating that a new cola was going to be placed on the shelf and that the first 1000 purchasers, for example, scanning their code into the network would receive some benefit, such as a chance to win a trip to some famous resort in Florida or some other incentive, the manufacturer would have a very good idea as to how well the advertisement was received. Further, the advertiser would know where the receptive markets were. If this advertiser, for example, had placed the television advertisement in ten cities and received overwhelming response from one city, but very poor response from another city, he would then have some inclination to believe that either one poor-response city was not a good market or that the advertising medium he had chosen was very poor. Since the advertiser can obtain a relatively instant response and also content with that response as to the demographics of the responder, very important information can be obtained in a relatively short time.

It should be noted that the disclosed embodiment is not limited to a single source PC 302, but may encompass a large number of source computers connected over a global communication network. Additionally, the embodiment is not limited to a single ARS 308 or a single advertiser server 312, but may include a plurality of ARS and advertiser systems, indicated by the addition of ARS 314 and advertiser server A 316, respectively. It should also be noted that this embodiment is not limited only to global communication networks, but also may be used with LAN, WAN, and peer-to-peer configurations.

It should also be noted that the disclosed embodiment is not limited to a personal computer, but is also applicable to, for example, a Network Computer ("NetPC"), a scaled-down version of the PC, or any system which accommodates user interaction and interfaces to information resources.

One typical application of the above noted technique is for providing a triggering event during a program, such as a sport event. In a first example, this may be generated by an advertiser. One could imagine that, due to the cost of advertisements in a high profile sports program, there is a desire to utilize this time wisely. If, for example, an advertiser contracted for 15 seconds worth of advertising time, they could insert within their program a tone containing the routing information. This routing information can then be output to the user PC 302 which will cause the user PC 302 to, via the network, obtain information from a remote location typically controlled by the advertiser. This could be in the form of an advertisement of a length longer than that contracted for. Further, this could be an interactive type of advertisement. An important aspect to the type of interaction between the actual broadcast program with the embedded routing information and the manufacturer's site is the fact that there is provided information as to the user PC 302 and a profile of the user themselves. Therefore, an advertiser can actually gain realtime information as to the number of individuals that are watching their particular advertisement and also information as to the background of those individuals, profile information, etc. This can be a very valuable asset to an advertiser.

In another example, the producer of the program, whether it be an on-air program, a program embedded in a video tape, CD-ROM, DVD, or a cassette, can allow the user to automatically access additional information that is not displayed on the screen. For example, in a sporting event, various statistics can be provided to the user from a remote location, merely by the viewer watching the program. When these statistics are provided, the advertiser can be provided with profile information and background information regarding the user. This can be important when, for example, the user may record a sports program. If the manufacturer sees that this program routing code is being output from some device at a time later than the actual broadcast itself, this allows the advertisers to actually see that their program is still being used and also what type of individual is using it. Alternatively, the broadcaster could determine the same and actually bill the advertiser an additional sum for a later broadcast. This is all due to the fact that the routing information automatically, through a PC and a network, will provide an indication to the advertiser the time at which the actual information was broadcast.

The different type of medium that can be utilized with the above embodiment are such things as advertisements, which are discussed hereinabove, contests, games, news programs, education, coupon promotional programs, demonstration media (demos), and photographs, all of which can be broadcast on a private site or a public site. This all will provide the ability to allow realtime interface with the network and the remote location for obtaining the routed information and also allow for realtime billing and accounting.

Referring now to FIG. 16, there is illustrated a general block diagram of a disclosed embodiment. A keystroke automator (KA) 1600 is provided by a keystroke automator distributor to customers and is associated with that distributor via a KA ID stored therein. The KA 1600 is operable to read machine-resolvable code (MRC) (e.g., a bar code). The KA 1600 is either sold or freely distributed to customers for use with their personal computing systems. Since more and more products are being sold using MRCs, it can be appreciated that a user having the keystroke automator 1600 can scan MRCs of a multitude of products in order to obtain more information. Information about these products can be made immediately available to the user from the manufacturer for presentation by the user's computer 302. Beyond simply displaying information about the product in which the user is interested, the keystroke automator distributor may include additional advertising information for display to the user such as information about other promotions or products provided or sold by the keystroke automator distributor. Similarly, advertisers may provide catalogs of advertisements or information in newspapers or periodicals where the user simply scans the MRC associated with the advertisement using the keystroke automator 1600 to obtain further information. There is provided a paper source 1602 having contained thereon an advertisement 1604 and an associated MRC 1606. (Note that the disclosed concept is not limited to scanning of MRCs 1606 from paper sources 1602, but is also operable to scan a MRC 1606 on the product itself. Also, the keystroke automator 1600 can be any type of device that will scan any type of image having information encoded therein.)

After obtaining the keystroke automator 1600 from the keystroke automator distributor, the user connects the keystroke automator 1600 to their PC 302. During a scanning operation, keystroke automator 1600 reads MRC data 1606 and the keystroke automator ID into a "wedge" interface 1608 for conversion into keyboard data, which keyboard data is passed therefrom into the keyboard input port of PC 302. The importance of the keystroke automator ID will be discussed in more detail hereinbelow.

The wedge interface 1608 is simply an interface box containing circuitry that accommodates inputs from both the keystroke automator 1600 and a computer keyboard 1610. This merely allows the information scanned by the keystroke automator 1600 to be input into the PC 302. In the disclosed embodiment, the wedge interface 1608 will convert any information. The data output from the keystroke automator 1600 is passed into the wedge interface 1608 for conversion into keyboard data which is readily recognizable by the PC 302. Therefore, the keystroke automator 1600 is not required to be connected to a separate port on the PC 302. This data is recognized as a sequence of keystrokes. However, the output of the keystroke automator 1600 can be input in any manner compatible with the PC 302. When not receiving keystroke automator data, the wedge interface 1608 simply acts as a pass-through device for keyboard data from the keyboard 1610. In any case, the information is ultimately processed by a processor in the PC 302 and can be presented to the user on a display 1612. The wedge interface 1608 is operable to provide a decoding function for the MRC 1606 and conversion thereof to keystroke input data.

In operation, the product code of a product is provided in the form of a MRC 1606. This MRC 1606 is the "link" to a product. The disclosed embodiment is operable to connect that product information contained in the MRC 1606 with a web page of the manufacturer of that product by utilizing the MRC 1606 as the product "identifier." The program operating on the PC 302 provides routing information to the ARS 308 after launching the browser on the PC 302 and connecting to the ARS 308 over the GCN 306, which ARS 308 then performs the necessary steps to cause the browser to connect to the manufacturer web site, while also providing for an accounting step, as will be described in more detail hereinbelow.

The MRC 1606 by itself is incompatible with any kind of network for the purposes of communication therewith. It is primarily provided for a retail-type setting. Therefore, the information contained in the MRC 1606, by itself, does not allow for anything other than identification of a product, assuming that one has a database 1614 containing information as to a correlation between the product and the MRC 1606.

The wedge interface 1608 is operable to decode the MRC 1606 to extract the encoded information therein, and append to that decoded MRC information relating to an ID for the keystroke automator 1600. This information is then forwarded to the ARS 308 by the resident program in the PC 302. This is facilitated by intermediate routing information stored in the program indicating to which node on the GCN 306 the scanned MRC information is to be sent, i.e., to the ARS 308.

It is important to note that the information in the MRC 1606 must be converted from its optical image to numerical values which are then ultimately input to the keyboard input port of PC 302 and converted into data compatible with communication software residing on the PC 302 (in this case, HTML language for insertion into a browser program). When the scanned information is input to the PC 302, the resident program launches the browser program and then assembles a communication packet comprised of the URL of the ARS 308, the keystroke automator ID and the user ID. If another type of communications program were utilized, then it would have to be converted into language compatible with that program. Of course, a user could actually key in the information on the MRC 1606 and then append the appropriate intermediate routing information thereafter. As will be described hereinbelow, the intermediate routing information appended thereto is the URL of the ARS 308 disposed on the GCN 306.

As part of the configuration for using the keystroke automator 1600, the PC 302 hosts keystroke automator software which is operable to interpret data transmitted from the keystroke automator 1600, and to create a message packet having the scanned product information and keystroke automator ID, routing information, and a user ID which identifies the user location of the keystroke automator 1600. The keystroke automator software loads at boot-up of the PC 302 and runs in the background. In response to receiving a scanned MRC 1606, the wedge interface 1608 outputs a keystroke code (e.g., ALT-F10) to bring the keystroke automator program into the foreground for interaction by the operating system. The keystroke automator program then inserts the necessary information into the browser program. The message packet is then transmitted to interface 304 across the global communication network 306 to the ARS 308. The ARS 308 interrogates the message packet and performs a lookup function using the ARS database 310. If a match is found between particular parameters of the message packet, a return message packet is sent back to the PC 302 for processing.

The keystroke automator program running on PC 302 functions to partition the browser window displayed to the user into several individual areas. This is for the purpose of preparing to present to the user selected information in each of the individual areas (also called "framing"). The selected information comprises the product information which the user requested by scanning the MRC 1606 using the keystroke automator 1600, information about the keystroke automator distributor which establishes the identity of the company associated with that particular keystroke automator 1600, and at least one or more other frames which may be advertisements related to other products that the keystroke automator distributor sells. Note that the advertisements displayed by the keystroke automator distributor may be related to the product of interest or totally unrelated. For example, if a user scans the MRC 1606 of a soda of Company A, the keystroke automator distributor may generate an advertisement of a new soft drink being marketed by Company A, that it sells. On the other hand, the keystroke automator distributor may also structure the display of information to the user such that a user requesting product information of a Product X may get the requested information of Product X along with advertisements for a competing item Product Y. Essentially, the keystroke automator distributor is free to generate any advertisement to the user in response to the user requesting product information.

The return message packet transmitted from the ARS 308 to the PC 302 is then transmitted back across the GCN 306 to the advertiser server 312. The advertiser server 312 restructures the message packet and appends the particular product information for transmission back to the PC 302. Upon receiving the particular advertiser information from advertiser server 312, the PC 302 then retransmits a message to the keystroke automator distributor site 1616 and E-commerce site 1618 to obtain the information that needs to be framed in the browser window displayed to the user.

Therefore, the keystroke automator 1600 is associated with the keystroke automator distributor by way of the keystroke automator ID such that scanning a product MRC 1606 in order to obtain information about that particular product generates one or more responses from one or more remote sites disposed on the GCN 306. Stored in the keystroke automator 1600 is the keystroke automator ID which establishes its relationship to the keystroke automator distributor. Proprietary keystroke automator software running on the PC 302 operates to decode scanned MRC information and the keystroke automator ID received from the keystroke automator 1600 and wedge interface 1608, and also provides a unique user ID for establishing the location of the user of the keystroke automator 1600. The keystroke automator software also assembles message packets and works in conjunction with the onboard communication software (e.g., a browser) to automatically route the message packets across the GCN 306 such that the one or more remote sites disposed on the GCN 306 return information to be framed for presentation to the user.

Referring now to FIG. 17, there is illustrated a conversion circuit of the wedge interface. A microcontroller 1700 provides conversion of the data from the keystroke automator 1600 and controls interfacing of the keyboard 1610 and keystroke automator 1600 with the PC 302. The microcontroller 1700 has contained therein a memory 1702 or it can have external memory. There are provided a plurality of keystroke automator interfaces 1704 to the keystroke automator 1600, a plurality of PC interfaces 1706 to the PC 302, and plurality of keyboard interfaces 1708 to the keyboard 1610. In general, the keystroke automator interfaces 1704 comprise a serial data line, a ground line, and a power line. Similarly, the keyboard interfaces 1708 comprise a serial data line, a ground line, a clock line, and a power line. The PC 302 provides a clock line, a power line, a serial data, and a ground line for input to the microcontroller 1700. The microcontroller 1700 is operable to receive signals from the keyboard 1610 and transfer the signals to the PC 302 as keyboard signals. Operation with the keyboard 1610 is essentially a "pass-through" procedure. Data output from the keyboard 1610 is already in keyboard format, and therefore requires no conversion by the wedge interface 1608. With respect to the keystroke automator 1600, the serial data is not compatible with a keyboard 1610 and, therefore, it must be converted into a keyboard format in order to allow input thereof to the keyboard input of the PC 302.

The microcontroller 1700 performs this function after decoding this MRC information, and conversion of this MRC information into an appropriate stream of data which is comprised of the MRC information and the appended URL. This appended URL will be pre-stored in the memory 1702 and is programmable at the time of manufacture. It is noted that the memory 1702 is illustrated as being contained within the microcontroller 1702 to provide a single chip solution. However, this could be external memory that is accessible by the microcontroller 1702. Therefore, the microcontroller 1700 provides an interface between the keystroke automator 1600 and the keyboard 1610 to the PC 302 which allows the keystroke automator 1600 to receive coded information and convert it to keyboard strokes or, alternatively, to merely pass-through the keystrokes from the keyboard 1610. Therefore, the user need not install any type of plug-in circuit board into the motherboard of the PC 302 in order to provide an interface to the keystroke automator 1600; rather, the user need only utilize the already available keyboard port in order to input the appropriate data into the system.

In this particular disclosed embodiment, the microcontroller 1700 comprises a PIC16C73 microcontroller by Microchip Technologies™ The PIC16C73 device is a low cost CMOS 8-bit microcontroller with an integrated analog-to-digital converter. The PIC16C73 device, as illustrated in the disclosed embodiment, has 192 bytes of RAM and 4k×4 of EPROM memory. The microcontroller 1700 can accommodate asynchronous or synchronous inputs from input devices connected to it. In this disclosed embodiment, communication to the keyboard 1610 is synchronous while it is asynchronous when communicating with keystroke automator 1600.

It should be noted that, although in this particular embodiment MRC information of the MRC 1606 is input into the keyboard input port of the PC 302, disclosed methods may also be advantageously utilized with high speed port architectures such as Universal Serial Bus ("USB") and IEEE 1394.

MRCs (e.g., bar codes) can be structured to be read in either direction. Timing considerations need to be addressed because of the variety of individuals scanning the MRC introduce a wide variety of scan rates. Bar codes use bars of varying widths. The presence of a black bar generates a positive pulse, and the absence of a black bar generates no pulse. Each character of a conventional bar code has associated therewith seven pulses or bars. Depending on the width of the bars, the time between pulses varies. In this disclosed embodiment, the interface circuitry 1608 performs a "running" calculation of the scan time based upon the rising edge of the pulses commencing with the leader or header information. The minimum and maximum scans times are calculated continuously in software with the interface 1608 during the scanning process to ensure a successful scan by the user.

Referring now to FIG. 18, there is illustrated a sample message packet transmitted from the user's PC 302 to the ARS 308. The message packet 1800 comprises a number of bits of information including the MRC information 1802 obtained from the user scanning the MRC 1606 with the keystroke automator 1600; the keystroke automator ID 1804 which is embedded in a memory in the keystroke automator 1600 and identifies it with a particular keystroke automator distributor; and a user ID 1806 which is derived from the software running on the PC 302 and which identifies uniquely with the user location. Note that the message packet includes other necessary information for the proper transmission for point to point.

Figure 19:
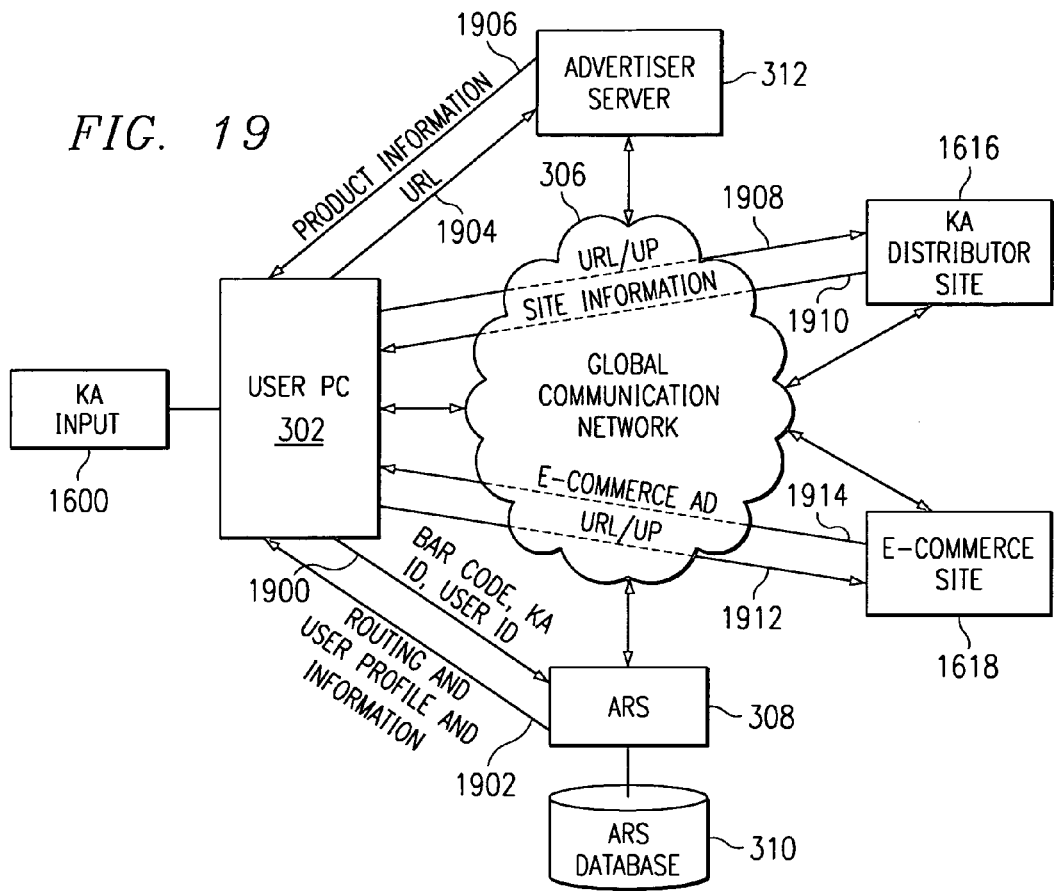
FIG. 19 illustrates a more detailed block diagram of the routing of the message packets between the various nodes.

Referring now to FIG. 19, there is illustrated a more detailed block diagram of the routing of the message packets in order to present the framed information to the user. As is mentioned hereinabove, when the user scans a MRC 1606 using the keystroke automator 1600, a keystroke automator program running on the user PC 302 is operable to interpret the information output by the keystroke automator 1600 and generate a message packet for transmission over the GCN 306. The keystroke automator program assembles the message packet such that it is directed to the ARS 308 disposed on the GCN 306. The message packet contains several pieces of information including the keystroke automator ID 1804 which links it to the keystroke automator distributor, the user ID 1806 which identifies the particular user using the keystroke automator 1600, and MRC information 1802 describing a particular product of interest to the user. This message from the PC 302 is transmitted over a path 1900 to the ARS 308 where the ARS database 310 is accessed to cross reference the ID information 1804 and MRC information 1802 to a particular advertiser and keystroke automator distributor. The ARS 308 returns a message packet over a path 1902 to the user PC 302 which contains routing information as to the location of various other sites disposed on the GCN 306, for example, the advertiser server 312 and keystroke automator distributor site 1616.

It can be appreciated that other information can also be provided by the ARS 308 which more closely targets the particular user of the keystroke automator 1600. For example, if it is known that a particular keystroke automator 1600 is sold in a certain geographic area, this information can be useful in targeting the particular user with certain advertising information relevant to that geographic area. In any case, the information returned from the ARS 308 over path 1902 provides enough information for the keystroke automator program running on the user PC 302 to identify a number of other sites disposed on the GCN 306. The user PC 302 then processes the return message packet and routes another message packet over a path 1904 to the advertiser server 312. The advertiser server 312 then returns product information of the particular product in which the user was interested back to the user PC 302 over a path 1906. Similarly, the user PC 302 routes information (e.g., the URL of the keystroke automator distributor site and the user profile) to the keystroke automator distributor site 1616 over a path 1908 in order to obtain information back over a path 1910 for framing any banners which identify the keystroke automator distributor. Additionally, the user PC 302 forwards a message packet to the E-commerce site 1618 over a path 1912 in order to return information regarding any particular advertisements the keystroke automator distributor wants to display to the user. The advertisements are returned to the PC 302 over a path 1914.

Figure 20:
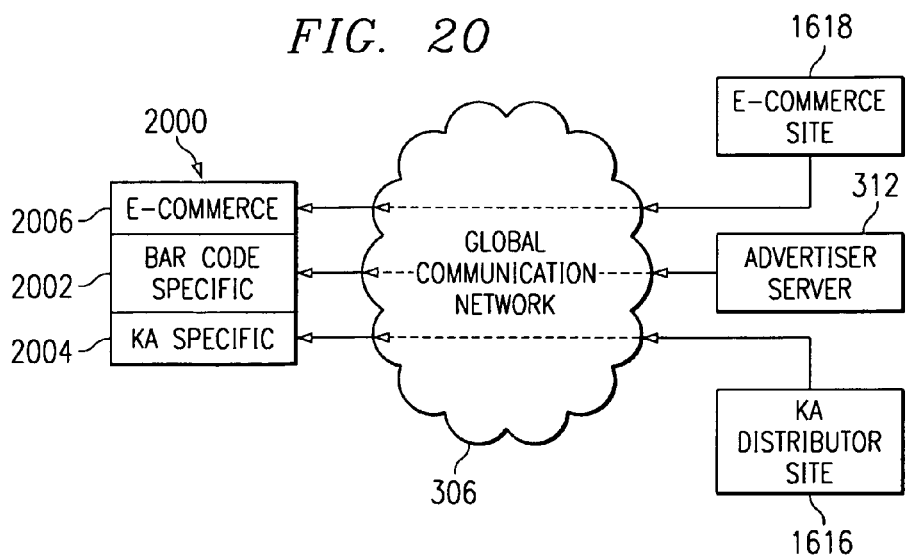
FIG. 20 illustrates a block diagram of a browser window, according to a disclosed embodiment.

Referring now to FIG. 20, there is illustrated a block diagram of a browser window according to the disclosed embodiment. The browser window 2000 is partitioned into a plurality of areas for framing specific information. A MRC area 2002 displays that product information in which the user was interested; a keystroke automator-specific area 2004 displays information about the keystroke automator distributor; and an E-commerce area 2006 displays advertising information that the keystroke automator distributor selects for display according to this particular user and keystroke automator 1600. As mentioned hereinabove, a program operable to process scanned MRC information with the unique keystroke automator 1600 develops the browser window by partitioning it into specific areas for the framing of information. Therefore, information returned from the E-commerce site 1608 is passed through the GCN 306 to the particular E-commerce frame 2006. Similarly, information about the particular product of interest is returned from the advertiser site 312 across the GCN 306 to the particular MRC specific area 2002. Information placed in the keystroke automator-specific area 2004 is information about the keystroke automator distributor which is returned from the keystroke automator distributor site 1616 across GCN 306.

Figure 21:
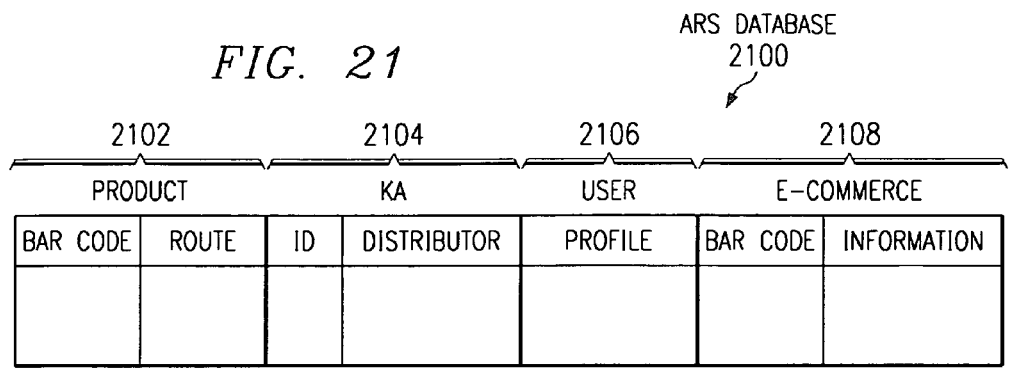
FIG. 21 illustrates a diagrammatic view of information contained in the ARS database.

Referring now to FIG. 21, there is illustrated a structure of information contained in the ARS database. The ARS database 310 contains a variety of information required to properly interrogate and assemble packets for obtaining information from the various sites disposed on the GCN 306. The ARS database 310 has a database structure 2100 which contains addresses for the web sites containing the product information requested by the user when scanning the MRC 1606 with the keystroke automator 1600. Under a Product heading 2102 are listed the particular MRCs and associated routing information for addressing the respective server location. For example, the ARS server 308 may contain any number of advertisers having unique URL addresses associated therewith. Therefore, the MRC 1606 of a particular product is associated with a unique URL address which routes any request for information of that product to that particular advertiser's site. Also part of the ARS database structure 2000 is a heading of Keystroke automator 2104 under which is the keystroke automator ID 1804 and the distributor associated with that keystroke automator ID 1804.

It can be appreciated that there may be a number of distributors using the disclosed architecture such that each distributor has an ID embedded in the keystroke automator 1600 which uniquely identifies that keystroke automator with the particular distributor. Therefore, the unique keystroke automator ID 1804 needs to be listed with the respective distributors of that keystroke automator 1600 in order to process the information that needs to be framed and displayed to that particular user. Another heading under the ARS database structure 2100 is a user heading 2106 which contains profile information associated with that particular user ID 1806. As mentioned hereinabove, the user ID 1806 is obtained via the keystroke automator software running on the PC 302 and upon installation or subsequent configuration may request that the user input certain profile information which may be used to target that particular user with products and services which identify with that user profile. The ARS database structure 2100 also contains an E-commerce heading 2108 which contains information related to the MRC 1606 and an advertisement that may be triggered by the request for that information. For example, any MRC 1606 associated with a paper source 1602 can be associated with the specific information in the ARS database 310. A user wishing to obtain information about a specific soft drink may, in fact, trigger an advertising response of a competitor product. Similarly, the user interested in information about that particular soft drink may also trigger information which is relevant to that particular product or a product which may normally be served in conjunction with that soft drink. Furthermore, if the user profile indicates that this individual has significant interest in finance or insurance, the request for information regarding this particular MRC product may trigger advertisement from an E-commerce server 1618 related to information about finance and insurance. It should be noted that the information described as contained within the ARS database structure 2100 is not limited to what has been described, but may comprise any number of pieces of information used to present desired information to the computer display of the user.

Figure 22:
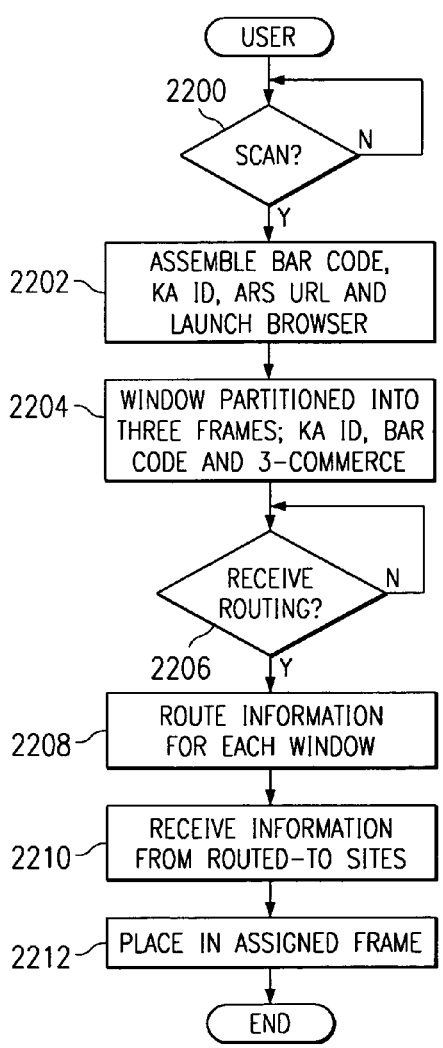
FIG. 22 illustrates a flowchart of the process of receiving information for the user's perspective.

Referring now to FIG. 22, there is illustrated a flowchart of the process of receiving information from the user's perspective, and according to the disclosed embodiment. The keystroke automator software running on the user's PC 302 runs in the background until activated by output from the keystroke automator 1600. Therefore, flow moves to a decision block 2200 where if a scanned input does not occur, flow moves out the "N" path and loops back to the input of decision block 2200. On the other hand, if scanned input information is received, flow moves out the "Y" path to a function block 2202 where the keystroke automator software assembles a message packet containing the MRC information, the keystroke automator ID 1804 and the ARS 308 URL address. Additionally, the browser is launched in which this information is placed for transmission to the ARS 308. Flow then moves to a function block 2204 where the browser is partitioned into any number of areas in which information is displayed when obtained from the keystroke automator distributor site 1616, the E-commerce site 1618, and the advertiser server 312. It should be known that although three frames are shown in the particular window 2000 of this embodiment, the number of frames displayed in the window 2000 is limited only by the available real estate of the window 2000 area itself.

After the keystroke automator software partitions the browser window into one or more frames in preparation of receipt of return information, flow moves to a decision block 2206 where the computer waits for information to be returned from the various sites disposed on the GCN 306. If information is not returned, flow moves out the "N" path and simply loops back to the input to continue monitoring for receipt of the information. If information has been received, flow moves out the "Y" path to a function block 2208 where routing information for each frame (or partitioned area of the window 2000) is inserted into one or more packets for transmission to the various sites. The various sites then return the requested information back to the PC 302, as indicated in function block 2210. Flow is then to a function block 2212 where the proprietary software working in conjunction with the hosted browser places the returned information into the respective frames of the window. The user, viewing the display at PC 302, then perceives a variety of information, one of which is the particular product information which he or she requested, in addition to keystroke automator distributor information, and possibly other advertisements based upon the user's profile.

Figure 23:
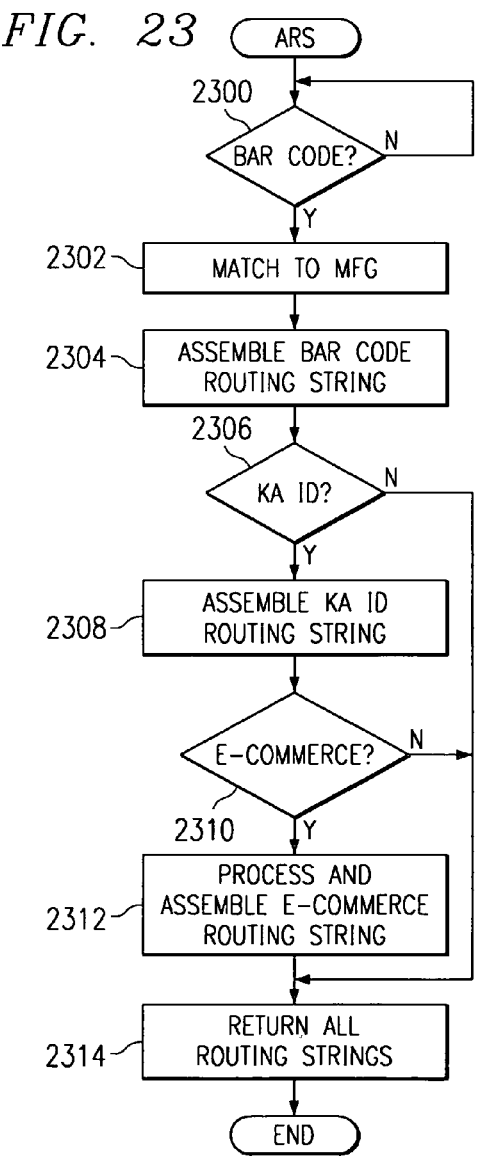
FIG. 23 illustrates a flowchart according to the ARS.

Referring now to FIG. 23, there is illustrated a flowchart of the process according to the ARS. The ARS 308 is operable to decode and process messages received from the GCN 306. Therefore, flow is to a decision block 2300 where, if MRC information is not received, flow is out the "N" path with loop-back to its input. If MRC information has been received, flow is to a function block 2302 where a matching process occurs to link the bar-coded product information to its respective manufacturer. The ARS database 310 also associates the URL address of the manufacturer's server. When a match is found, the ARS 308 begins to assemble a message packet of information for transmission back to the PC 302, as indicated in function block 2304. The message packet contains the product information and the URL address of the manufacturer's website. Flow then moves to a decision block 2306 where the keystroke automator ID 1804 is compared with the list of keystroke automator IDs issued by the particular keystroke automator distributor. If the keystroke automator ID 1804 is validated, flow moves out the "Y" path to a function block 2308 where the message packet is appended with the keystroke automator ID 1804 and distributor routing address. Flow then moves to a decision block 2310 where the ARS 308 determines if any E-commerce information is to be associated with a particular keystroke automator ID 1804. If so, flow is out the "Y" path to a function block 2312 where the message packet is appended with the E-commerce routing string. The E-commerce routing string provides addressing for the E-commerce server 1618. Flow then moves to a function block 2314 where all message packets are returned back to the PC 302 for processing.

Referring back to decision block 2306, if the keystroke automator ID 1804 is determined to be invalid, flow moves out the "N" path and jumps forward to the input of decision block 2314, since the lack of a keystroke automator ID 1804 interrupts the link to any advertising provided by the E-commerce server 1618. At this point, the only information provided is the link to the advertiser server 312 for return of product information. Referring now to decision block 2310, if no E-commerce information is available, flow moves out the "N" path and jumps forward to the input of function block 2314 where the message packet back to the PC 302 contains only the URL of the advertiser server 312, the MRC information, the distributor server 1616 address and keystroke automator ID 1804 information.

Figure 24:
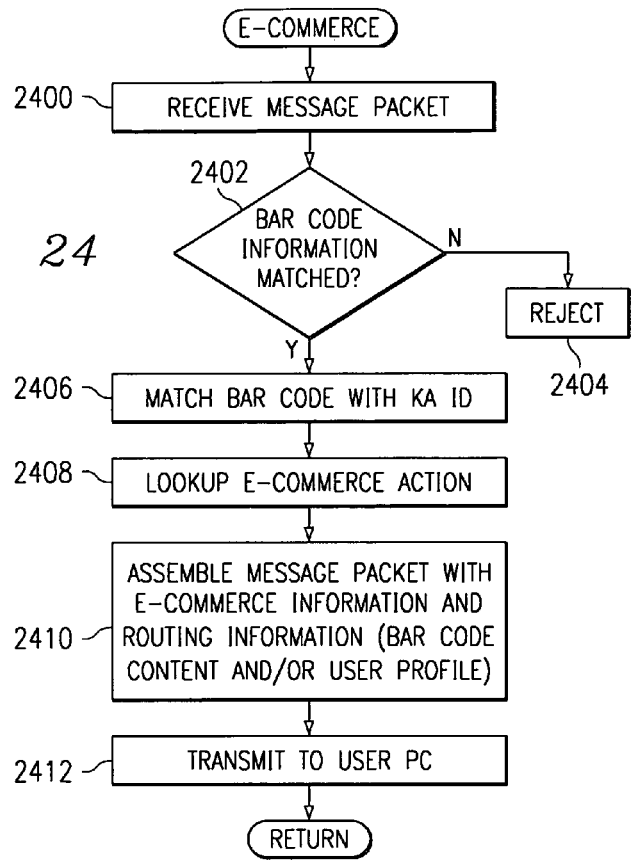
FIG. 24 illustrates a flowchart of the process performed at the E-commerce node.

Referring now to FIG. 24, there is illustrated a flowchart of the process performed at the E-commerce site. The E-commerce server 1618 receives the message packet from the user PC 302, as indicated in function block 2400, and decodes the packet to perform a match with the MRC information. Moving on to a decision block 2402, if the match is unsuccessful, flow is out the "N" path to a function block 2404 where the match is rejected. A message may be returned to indicate that a problem occurred and the user may need to re-scan the product MRC 1606. If a successful match occurs, flow moves out the "Y" path to a function block 2406 where the keystroke automator ID 1804 is matched with the MRC product information. The MRC information may be distributed to customers over a large geographic area. However, the keystroke automator 1606 may be coded for certain geographic areas. For example, a keystroke automator 1600 having an XXX ID may be restricted for sale in the Southwestern United States while a keystroke automator 1600 having a YYY ID may be sold only in the Northeast. In this way, geographic areas may be targeted with advertising more appealing to that particular area. Advertising returned to the user PC 302 may be focused further by obtaining a user profile when the software or keystroke automator 1600 are installed. In this way, advertising may be focused based upon the user profile. Therefore, flow moves to a function block 2408 to lookup the E-commerce action based upon the keystroke automator ID 1804 and the MRC information. Flow moves to a function block 2410 to assemble all the information into a packet for return to the user PC 302. The product information and/or user profile information may be returned. Flow is then to a function block 2412 where the message packet is transmitted.

Controlling a Computer Using a Cellular Telephone

Figure 25:
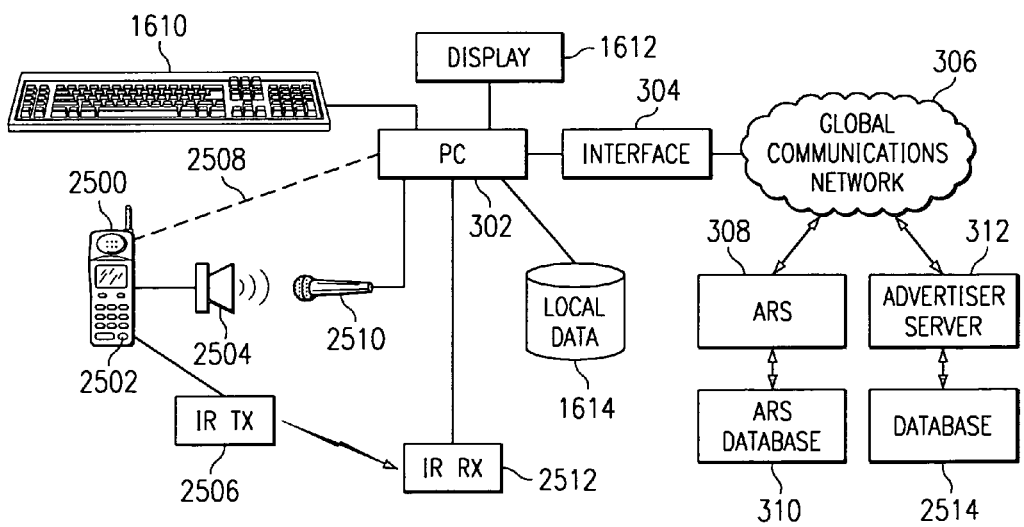
FIG. 25 illustrates a disclosed embodiment using a cellular telephone to trigger presentation of a web page.

Referring now to FIG. 25, there is illustrated a disclosed embodiment using a cellular telephone to trigger presentation of a web page. The cellular telephone 2500 contains a unique code embedded therein operable to cause the output of a correspondingly unique signal. The unique code can be imbedded in the cellular telephone 2500 from the manufacturer, or, as will be described in greater detail hereinbelow, received into the cellular telephone 2500 by a number of ways for use according to a disclosed embodiment. The user of the cellular telephone 2500 can generate the unique signal by depressing a signal generation button 2502 (either a dedicated button or a multifunction button) to facilitate output of the unique signal. The unique signal can be transmitted to the user PC 302 in a number of ways, including via an audio signal emitted from a speaker 2504 of the cellular telephone 2500, by an infrared transmitter 2506 illustrated as being external to the cellular telephone 2500, but can be integral to the cellular telephone 2500, itself. Additionally, the cellular telephone 2500 can be hardwired via a cable connection 2508 to the PC 302, which may be through a serial bus connection (RS-232) or a parallel bus connection, or some other connection.

The cellular telephone is also operable to respond by emitting audio in the form of DTMF (Dual Tone Multi-Frequency) signals via the speaker 2504. When using the speaker 2504 as the output for the unique signal, a corresponding input receiver 2510 connected to the PC 302 receives the audio input for further processing by the PC 302. Similarly, when using the infrared transmitter 2506, a corresponding infrared receiver 2512 facilitates an infrared connection to the PC 302. Using any of the previous methods to transmit the unique signal to the PC 302, the PC 302 decodes the signal to extract the unique code contained therein, and appends routing information to transmit the unique code through the network interface 304 across the GCN 306 to the ARS 308 in accordance with the steps described hereinabove. The ARS 308, having the ARS database 310 associated therewith, extracts the unique code and performs a matching operation on the ARS database 310 to obtain an associated URL network address of the advertiser server 312. The advertiser URL network address is then returned back to the PC 302, and therefrom to the advertiser server 312 disposed on the GCN 306 and having that URL network address.

The advertiser server 312 has a database 2514 associated therewith for storing information which the user of the cellular telephone 2500 may wish to retrieve and have displayed. Notably, the cellular telephone 2500 has a memory which can store multiple pieces of information including not only telephone numbers, but one or more of the unique codes. Each unique signal associated with a respective unique code, when selected for output, results in the ultimate retrieval of a different web page from the advertiser server 312 having the corresponding information. The return web page information is then presented on the display 1612 to the user. The keyboard 1610 provides user control of the PC 302, for example, configuring the computer 302 using data stored on the local data storage unit 1614.

Figure 26:
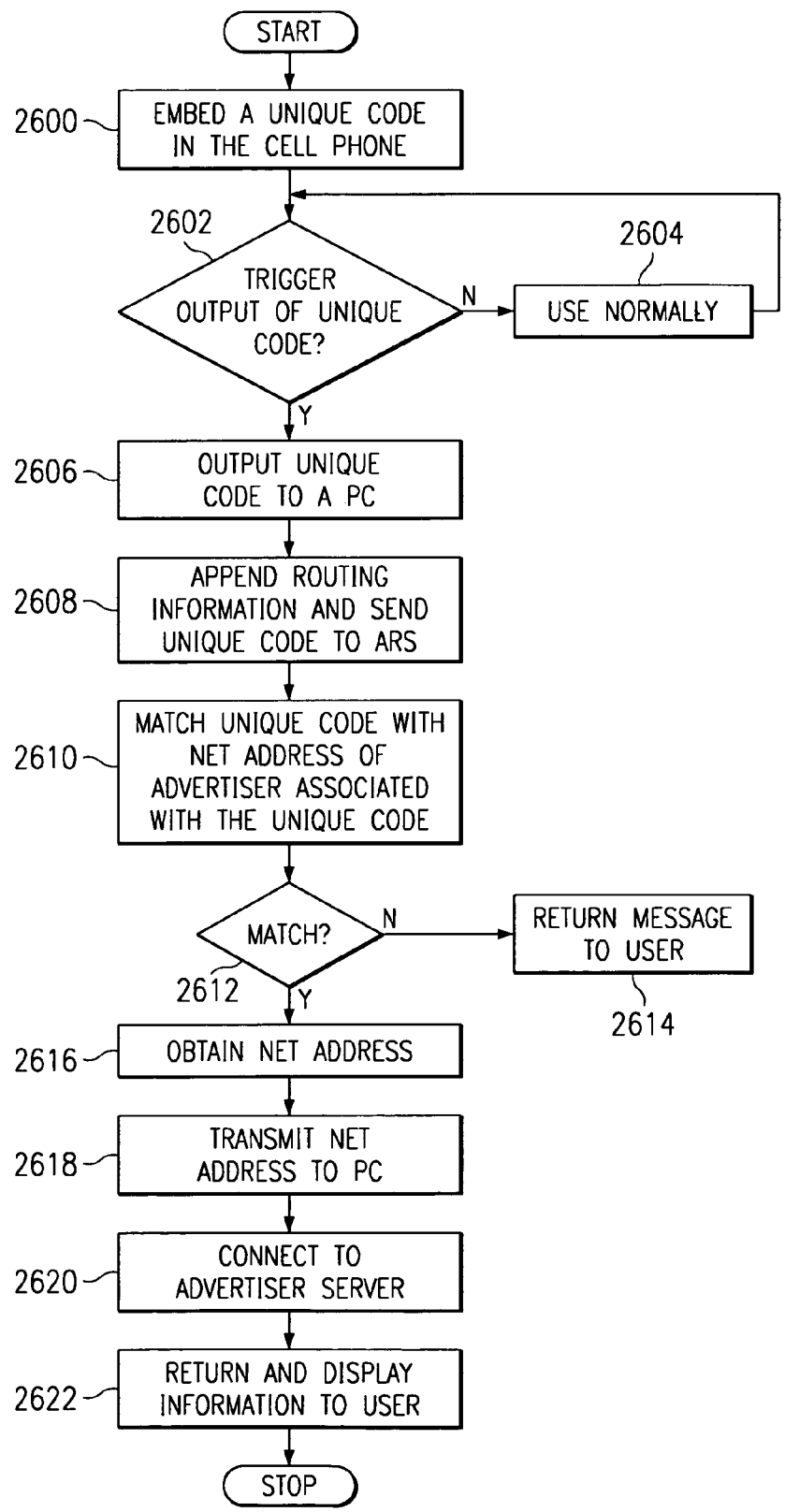
FIG. 26 illustrates a flowchart of the disclosed process.

Referring now to FIG. 26, there is illustrated a flowchart of the disclosed process. Flow begins at a Start point and continues to a function block 2600 where the unique code is embedded in the cellular telephone 2500. As mentioned hereinabove, it can be appreciated that more than one unique code may be imbedded in the cellular telephone 2500 allowing transmission of a plurality of unique signals in response to which correspondingly different product information is returned and displayed to the user. When embedding more than one unique code into the telephone 2500, the user will be presented with numerous ways to obtain these codes. For example, a single button that is dedicated to the unique code aspect can be provided with a "shift" function such that two unique codes can be selected. Alternatively, the depressing of the button multiple times could result in a separate code going out or, alternatively, merely pressing it a second time will output another code. There could, of course, be provided multi-function buttons having unique codes associated therewith. Further, each of the unique codes could be associated with different buttons by the user through reconfiguration of the keypad on the telephone. All of these are well-known techniques. Flow is then to a decision block 2602 where the cellular telephone 2500 processor monitors the trigger button 2502 to determine if the user has enabled transmission of the unique signal. If not, flow is out the "N" path to a function block 2604 where the user continues to use the cellular telephone 2500 in its normal mode. Flow is then out of function block 2604 back to the input of decision block 2602 to continue monitoring the trigger button 2502.

On the other hand, if the user triggers output of unique code, flow is out the "Y" path to a function block 2606 where the unique code is output in the form of a unique signal to the PC 302. Flow continues to a function block 2608 where routing information is appended to the unique code, which unique code has been extracted from the unique signal, and which is sent to the ARS 308 for further processing. The unique code is extracted from the received message packet at the ARS 308 and used in a matching operation on the ARS database 310 to obtain the network URL address of the associated advertiser server, as indicated in a function block 2610. Flow is then to a decision block 2612 to determine if a successful match has occurred. If not, flow is out the "N" path to a function block 2614 to return a message to the user that other action is required to complete the process. On the other hand, if a successful match has occurred, flow is out the "Y" path to a function block 2616 to obtain the matching network address of the advertiser server 312. Flow is then to a function block 2618 where the network address of the advertiser server 312 is then transmitted back to the PC 302. Flow is to a function block 2620 where the PC 302 then connects to the advertiser server 312 in accordance with the returned advertiser network address. Flow is then to a function block 2622 where the advertiser server 312 retrieves the associated URL information from its database 2514 and returns it to the user PC for presentation to the user via display 1612. The process then reaches a Stop point.

Figure 27:
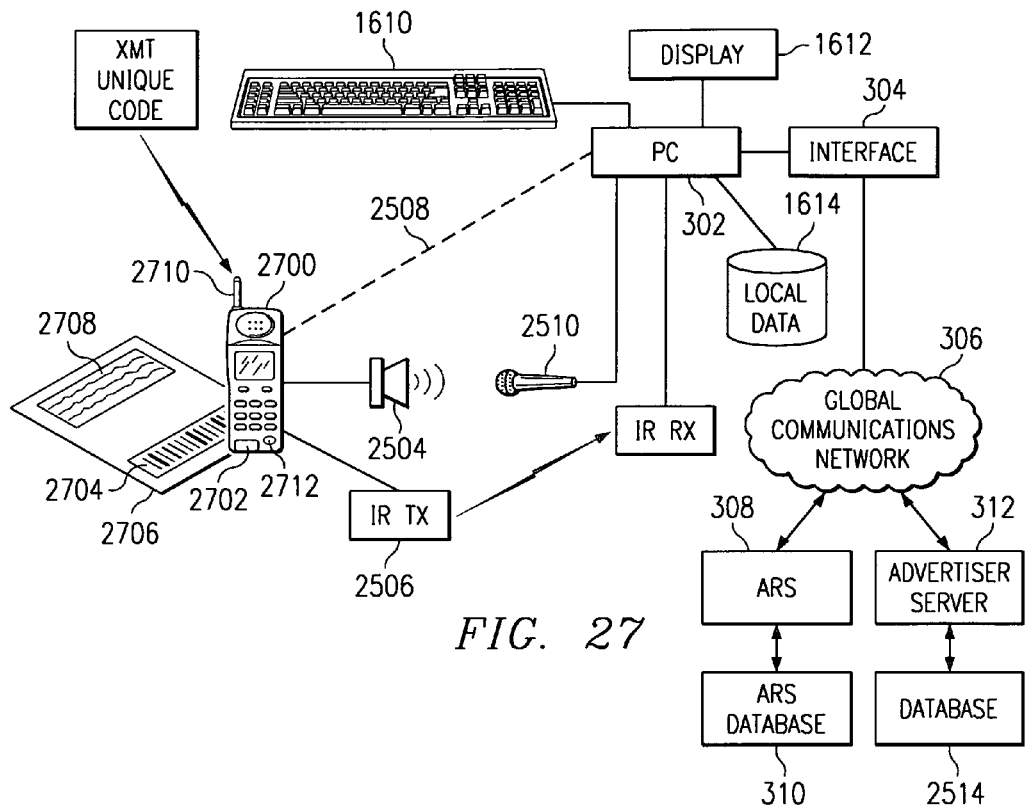
FIG. 27 illustrates an alternative embodiment where the cellular telephone comprises alternate means for obtaining the unique code.

Referring now to FIG. 27, there is illustrated an alternative embodiment where the cellular telephone comprises an alternate technique for obtaining the unique code. The cellular telephone 2700 contains a scanner head 2702 which can read an MRC 2704 placed on, for example, a printed document 2706 having information 2708 describing the particular unique code contained within the MRC 2704. The text 2708 would also describe the associated product information of the MRC to better inform the user of the purpose of the MRC 2704. The cellular telephone 2700 also contains an antenna 2710 for receiving a incoming transmission of the unique code in a corresponding unique signal. Notably, the cellular telephone 2700, as mentioned hereinabove, can be configured to accommodate a plurality of unique codes such that they can be obtained by any of the techniques for receiving the unique code.

After scanning the MRC 2704, the cellular telephone 2700 processes the information to extract the unique code and store it in the memory contained therein. The user can transmit the unique code then by simply pressing the transmit button 2712 to facilitate communication of the unique code with the PC 302. In conjunction with normal use of the cellular telephone 2700 where the user can scroll through various stored telephone numbers, the user can likewise scroll through a plurality of unique codes stored therein. The user can then select which unique code to transmit in order to receive the corresponding web page or product information for display at the PC 302. The cellular telephone 2700 also includes the infrared transmitter 2506, the onboard speaker 2504, and capability of a hardwire connection 2508 to the PC 302: Although not illustrated, another method through which the user can obtain the unique code is by placing the cellular telephone 2700 in its charging cradle or docking station, which charging cradle may then have communication circuits for transmitting one or more unique codes thereinto.

The PC 302 using the received unique signal information from any of several modes, processes the received signal to extract the unique code therefrom. The unique code is assembled into a message packet with appended routing information, which appended routing information is the URL network address of the ARS 308. The message packet is then transmitted through the network interface 304 across the GCN 306 to the ARS 308 to perform a matching operation on the ARS database 310 in order to obtain the associated advertiser network address. Similar to operation of the system of FIG. 25, the associated advertiser network address is returned to user PC 302, which then connects to the advertiser server 312 to retrieve the associated web page or product information for display to the user on the display 1612. The keyboard 1610 is provided for manual entry of any information to the PC 302.

Referring now to FIG. 28, there is illustrated a flowchart of the process for using the cellular telephone according to FIG. 27. Flow begins at a Start point and moves to a function block 2800 where the unique code is input to the cellular telephone 2700 via any number of methods, including transmitted into the phone 2700 using the antenna 2710, scanning the unique code into the phone 2700 via an MRC 2704, or using the hardwire connection to transmit the code into the phone 2700. Although not illustrated, it can appreciated that the infrared port may be configured as a transmit/receive port such that the unique code(s) could be stored into the phone 2700 via that port. Flow is then to a function block 2802 where the user selects the unique code to be output. As mentioned hereinabove, it can be appreciated that the cellular telephone 2700 includes sufficient memory to store a plurality of unique codes having correspondingly unique signals.

Flow is then to a function block 2804 where the user presses the trigger button 2712 to output a tone or signal information to the user PC 302. If in an audio format, the tone can be in the form of DTMF signals. Flow continues to a function block 2806 where the PC 302 receives the transmitted signal and extracts the unique information from the signal. Flow continues on to a function block 2808 where routing information is appended to the extracted unique information and the combination transmitted to the ARS 308 in accordance with the routing information. A matching operation is performed on the ARS database 310 in block 2810 to obtain the network address of the advertiser server 312 having the requested product information. Flow is then to a decision block 2812 to determine if a successful match has occurred. If not, flow is out the "N" path to a function block 2814 where a message is returned to the user indicating that other action is required. On the other hand, if a successful match has occurred, flow is out the "Y" path to a function block 2816 where the advertiser network address is obtained.

Flow continues on to a function block 2818 where the network address is transmitted back to the PC 302. The PC 302 then connects to the advertiser server 312 in response to the received network address, as indicated in a function block 2820. Flow is then to a function block 2822 where the advertiser server 312 returns the associated product information to the user PC and presents information on, for example, the display 1612. Notably, the information may also be in the form of audio information which could be played back to the user using a multimedia system of the PC 302. Flow is then to a Stop point.

Figure 29:
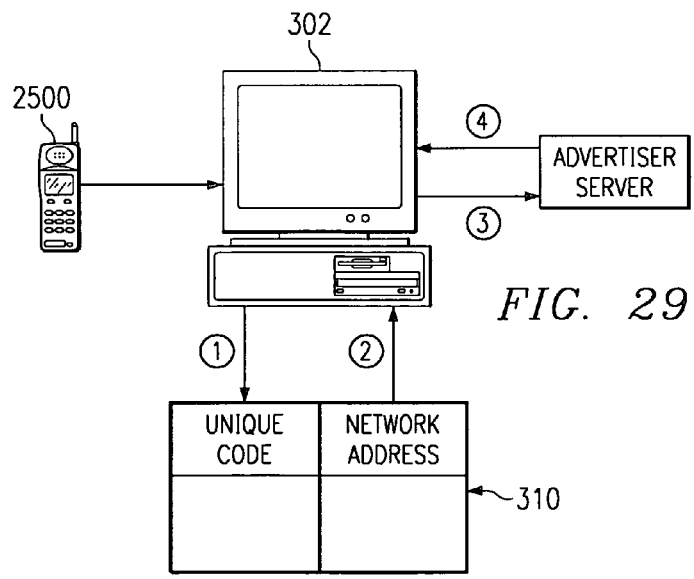
FIG. 29 illustrates a simplified diagram of the interchange between the various components of the disclosed system.

Referring now to FIG. 29, there is illustrated a simplified diagram of the interchange between the various components of the disclosed system. The cellular telephone 2500 (or 2700) transmits a signal to the PC 302, which PC 302 then extracts the unique code therefrom and appends routing information which then directs the unique code to be transmitted along a path (1) to the ARS database 310. A successful match results in the unique code being associated with the network address of the advertiser server 312, the network address being returned to the PC 302 along a path (2). The user PC 302 then transmits the network address information of the product associated with the unique code along the path (3) to the advertiser server 312. The advertiser server 312 in response thereto provides the product information from its associated database 2514 back to the user PC 302 along a path (4).

Figure 30:
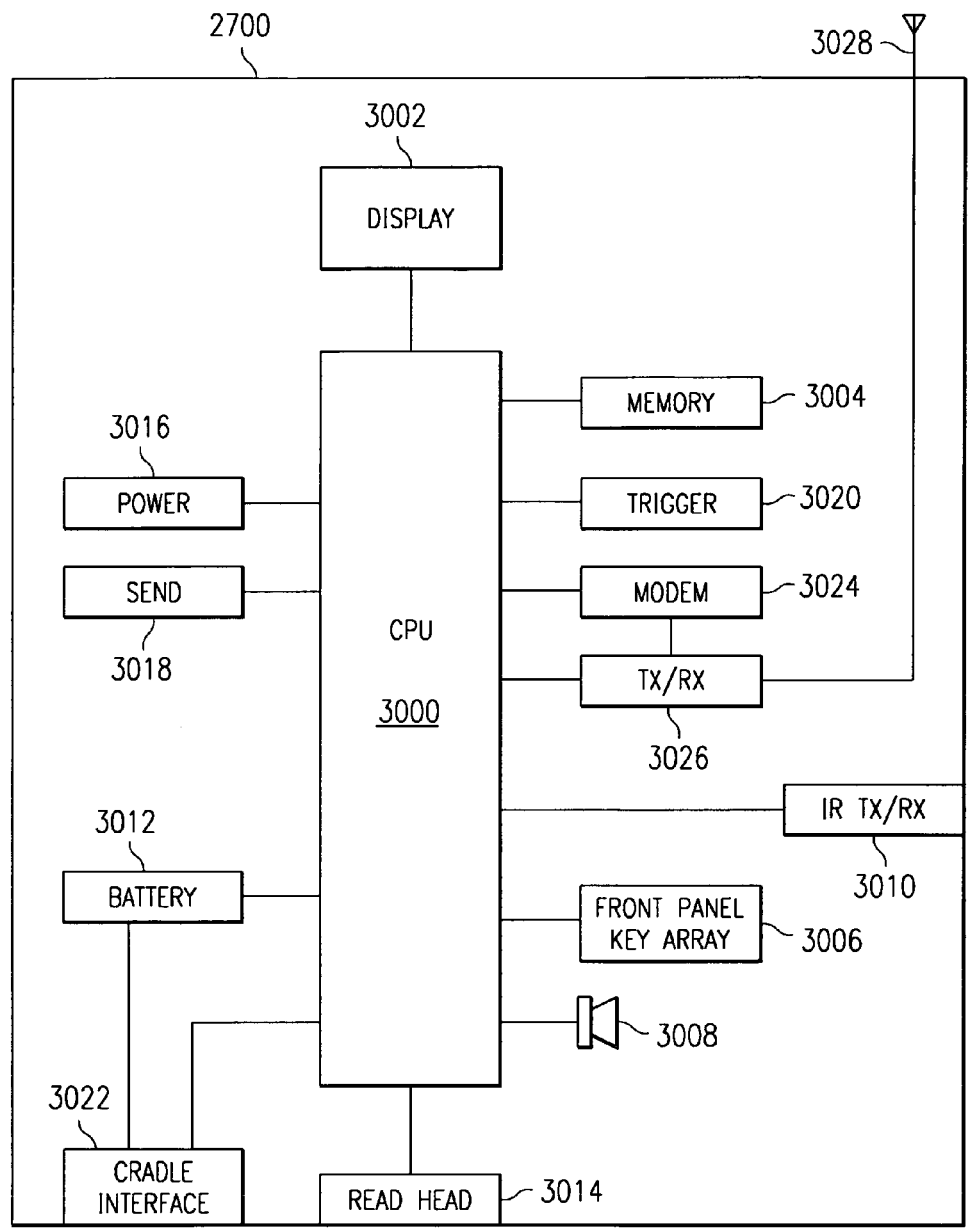
FIG. 30 illustrates a more detailed block diagram of the cellular telephone of FIG. 27.

Referring now to FIG. 30, there is illustrated a more detailed block diagram of the cellular telephone of FIG. 27. The cellular telephone 2700 contains a CPU 3000 which controls all onboard functions. The cellular telephone has a display 3002 for displaying various user information such as telephone numbers, text describing one or more unique codes stored therein, and other information provided by the cellular telephone 2700. In addition to the display 3002 being connected to the CPU 3000, a memory 3004 connects also to the CPU 3000 for storing telephone numbers and one or more of the unique codes disclosed herein in addition to unique phone ID information associated with the phone 2700. The cellular telephone 2700 also includes a front panel key array 3006 used in the conventional mode for inputting telephone numbers to be dialed, but in this particular embodiment, can also be used to select the desired unique code for output in any of the aforementioned methods. For example, one set of numbers keyed in via the front panel array 3006 would indicate to output the unique code No. 1 via the IR transmitter/receiver port 3010. Similarly, another set of numbers input from the front panel array 3006 would indicate that a second unique code be transmitted via an audio speaker 3008 in a DTMF format.

The CPU 3000 also has connected thereto the speaker 3008 for audio output of the unique signal representing the unique code, the IR transmitter/receiver 3010 which accommodates transmission or reception of IR signals from the PC 302, a battery 3012 for providing all onboard power for the cellular telephone 2700, a read head 3014 (similar to read head 2702) which comprises the emitter/detector electronics for reading the MRC 2704, a power button 3016 for turning power on to the cellular telephone 2700, a send button 3018 for dialing a telephone number in the conventional method of a cellular telephone 2700, a trigger button 3020 for triggering retransmission of the selected unique code to the PC 302, and a cradle interface 3022 for interfacing to a power charging cradle or powering substation when not in use.

The CPU 3000 also has connected thereto a modem 3024 and transmitter/receiver 3026 for transmitting the unique signal, and communicating any dialed telephone numbers, via an antenna 3028. This communication circuit (modem 3024 and transmit/receive 3026) also accommodates reception of incoming calls of the cellular telephone in the conventional sense, but is operable to receive as a download one or more of the unique codes for storage in the onboard memory 3004. Similarly, the read head 3014 can scan an MRC 2704, as described in detail hereinabove, to obtain a unique code. The infrared transmit/receive circuit 3010 also accommodates input and output of a unique code to and from the cellular telephone 2700.

With the use of the above-noted telephone having associated therewith output devices in the form of either a speaker or an IR transmitter, it is possible for a user, through the simple action of depressing a dedicated button, to interact with a PC display 1612 to actually launch a website. For example, the user can merely hold the phone 2500 in close proximity to the 302 PC that is associated with the functionality of the present disclosure to facilitate "jumping" to a website. The user merely looks at the display 1612 associated with the PC 302, depresses the button and the next action the user sees is the desired website to appear. In the ARS 308, the relational database 310 associates the unique code that is transmitted by the telephone 2500 with at least one site. This may be a dynamic pointer or routing operation, wherein this location is varied as a result of certain predetermined criteria. One of these criteria may be the time of day, statistics as to what type of things the particular user has selected prior, etc. In order to facilitate this, transmission of the unique ID is also combined with transmission of the stored unique ID information regarding the phone 2500. This can be a shortened code, or it can be the serial number of the phone 2500 that is typically transmitted in normal operation of the phone 2500. In any event, there is a device ID that is transmitted along with the unique code to the PC 302 for routing to the ARS 308. Once received by the ARS 308, the user ID can facilitate access to various user information that was pre-stored by the user of the phone 2500, or which has been associated with the user by the phone manufacturer, and then route to the PC 302 accordingly. It may be that the unique code is associated with all phones of a set type, such that, by depressing the button on the phone, the user is forwarded to a dedicated website of the phone manufacturer to a location that can only be accessed with the unique code.

Although the preferred embodiment has been described in detail, it should be understood that various changes, substitutions and alterations can be made therein without departing from the spirit and scope of the invention as defined by the appended claims.

What is claimed is:

1. A method for accessing information over a network from a remote location on the network for delivery to a user PC, comprising the steps of:

providing a functional mode on a cellular telephone for web access over the network, the cellular telephone separate from the user PC and the functional mode having associated therewith a unique code;

associating at least a button on the cellular telephone with the functional mode;

activating the button on the cellular telephone to activate the functional mode when the user is in physical proximity to the user PC and, in response thereto, transferring to the user PC unique code, which unique code has no routing code contained therein that would by itself uniquely identify the location of the remote location on the network, but which unique code has a predetermined association with the remote location; and in response to activation of the functional mode, the user PC then utilizes the unique code received from the cellular telephone and the predetermined association thereof with the remote location to access information from the remote location on the network for delivery to the user PC and display thereof on a display associated with the user PC;

such that the user PC is controlled in accordance with the unique code to access the predetermined remote location;

wherein the step of providing the functional mode comprises storing the unique code in the cellular telephone, which unique code is associated in the step of associating with the button, such that the unique code is output as a function of activation of the button in the step of activating for delivery to the user PC in the step of controlling.

2. The method of claim 1, wherein the step of activating comprises transmitting the unique code to the user PC and the user PC further including the step of receiving the unique code from the cellular telephone and, in response thereto, accesses the information from the remote location on the network.

3. The method of claim 2, wherein the step of transmitting comprises transmitting via a wireless mode.

4. The method of claim 2, wherein the step of transmitting comprises transmitting an audio signal wherein the step of receiving comprises receiving and detecting the audio signal and extracting the information in the unique code therefrom.

5. The method of claim 3, wherein the step of transmitting via the wireless mode includes transmitting via an optical link.

6. The method of claim 1, wherein the step of controlling the user PC further comprises the steps of:

receiving the unique code;

transmitting the unique code to an intermediate node on the network;

providing a relational database at the intermediate node on the network having contained therein a relational table between one or more unique codes and corresponding location information of the network;

comparing the unique code transmitted to the intermediate node with location information that resides in the informational database and, if there is a match, transmitting the matched location information back to the user PC; and connecting the user PC to the remote location in accordance with the matched location information returned thereto from the intermediate node.

7. The method of claim 1, wherein the network is a global communication network.

8. The method of claim 1, wherein the cellular telephone has a communication mode to allow voice communication where the cellular telephone communicates via a cellular telephone network and the step of transferring to the user PC the unique code occurs over a separate communication link between the user PC and the cellular telephone.

9. An apparatus for accessing information over a network from a remote location on the network for delivery to a user PC;

a cellular telephone for providing a functional mode for web access over the network, the cellular telephone separate from the user PC, the functional mode having associated therewith a unique code;

at least a button on said cellular telephone associated with said functional mode;

wherein said button on said cellular telephone is activated to initiate said functional mode when the user is in physical proximity to the user PC and transfer to the user PC the unique code, which unique code has no routing information contained therein that would by itself uniquely identify the location of the remote location on the network, but which unique information has a predetermined association with the remote location; and wherein, in response to activation of the functional mode, the user PC utilizes said unique code received from this cellular telephone and the predetermined association thereof with the remote location to access information from the remote location on the network for delivery to the user PC and display thereof of said information on a display associated with the user PC;

such that the user PC is controlled in accordance with said unique code to access said predetermined remote location; and wherein the unique code is stored in said cellular telephone, which said unique code is associated with said button, such that said unique code is output to the user PC as a function of activation of said button.

10. The apparatus of claim 9, wherein the unique code is transmitted to the user PC, and the user PC said unique code is received from said cellular telephone and, in response thereto, said information from said remote location on the network is accessed.

11. The apparatus of claim 10, wherein said unique code is transmitted via a wireless mode.

12. The apparatus of claim 10, wherein an audio signal is transmitted to the user PC, which user PC receives and detects said audio signal, and extracts said unique code therefrom.

13. The apparatus of claim 11, wherein said unique code is transmitted via an optical link.

14. The apparatus of claim 9, wherein the user PC is controlled to receive said unique code, and to transmit said unique code to an information system on the network, said information system on the network comprising:
- an intermediate node which receives the unique code; and
- a relational database at said intermediate node having contained therein a relational table between one or more said unique codes and corresponding location information of the network;
- wherein said unique code which is transmitted to said intermediate node is compared with said location information that resides in said relational database and, if there is a match, transmitting said matched location information back to the user PC;
- wherein the user PC is connected to said remote location in accordance with said matched location information returned thereto from said intermediate node.

15. The apparatus of claim 9, wherein the network is a global communication network.

16. The apparatus of claim 9, wherein the cellular telephone has a communication mode to allow voice communication where the cellular telephone communicates via a cellular telephone network and the cellular telephone is operable to transfer to the user PC the unique code over a separate communication link between the user PC and the cellular telephone.

* * * * *